United States Patent
Kruk et al.

(10) Patent No.: US 8,103,534 B2
(45) Date of Patent: *Jan. 24, 2012

(54) SYSTEM AND METHOD FOR MANAGING SUPPLIER INTELLIGENCE

(75) Inventors: Jeffrey M. Kruk, Macomb, MI (US); Peter P. Quigney, Plano, TX (US); Kasra Kasravi, W. Bloomfield, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3603 days.

This patent is subject to a terminal disclaimer.

(21) Appl. No.: 10/279,188

(22) Filed: Oct. 23, 2002

(65) Prior Publication Data

US 2003/0120504 A1    Jun. 26, 2003

Related U.S. Application Data

(60) Provisional application No. 60/344,440, filed on Oct. 23, 2001.

(51) Int. Cl.
*G06Q 10/00* (2012.01)

(52) U.S. Cl. ............... 705/7.22; 705/7.23; 705/7.25; 705/7.36; 705/7.37

(58) Field of Classification Search ............... 705/1.1, 705/7.22, 7.23, 7.25, 7.36, 7.37
See application file for complete search history.

(56) References Cited

U.S. PATENT DOCUMENTS

| | | | | |
|---|---|---|---|---|
| 4,965,763 A | 10/1990 | Zamora | ............ | 364/900 |
| 5,319,542 A | 6/1994 | King, Jr. et al. | ............ | 364/401 |
| 5,499,108 A | 3/1996 | Cotte et al. | ............ | 358/400 |
| 5,537,524 A * | 7/1996 | Aprile | ............ | 345/440 |
| 5,594,639 A | 1/1997 | Atsumi | ............ | 364/468.14 |
| 5,615,109 A * | 3/1997 | Eder | ............ | 705/8 |
| 5,799,286 A * | 8/1998 | Morgan et al. | ............ | 705/30 |
| 5,870,717 A | 2/1999 | Wiecha | ............ | 705/26 |
| 5,970,475 A * | 10/1999 | Barnes et al. | ............ | 705/27 |
| 5,991,876 A | 11/1999 | Johnson et al. | ............ | 713/200 |
| 6,023,683 A | 2/2000 | Johnson et al. | ............ | 705/26 |
| 6,122,077 A | 9/2000 | Kaji | ............ | 358/448 |
| 6,212,494 B1 | 4/2001 | Boguraev | ............ | 704/9 |

(Continued)

FOREIGN PATENT DOCUMENTS

WO    WO 01/71526    9/2001

(Continued)

OTHER PUBLICATIONS

"NTT Completes . . . Procurement Costs", Dec. 15, 1898, Business Wire, p0201, pp. 1-2.*

(Continued)

*Primary Examiner* — Dean T Nguyen

(57) ABSTRACT

A method of managing supplier intelligence is provided. The method includes collecting procurement data from a plurality of data sources. The procurement data includes information regarding a plurality of business divisions of a business entity. The method further includes generating spend formulas for each business division for determining spending associated with each business division. The method further includes generating a set of supplier intelligence business rules that interrelate at least one spend formula associated with a first one of the business divisions with at least one spend formula associated with a second one of the business divisions. The method further includes automatically analyzing a portion of the procurement data based on the supplier intelligence business rules to determine the financial effects of a decision made by the first business division on the second business division. The method further includes automatically generating a visual output indicating the results of the analysis.

26 Claims, 14 Drawing Sheets

U.S. PATENT DOCUMENTS

| | | | |
|---|---|---|---|
| 6,502,081 B1 | 12/2002 | Wiltshire, Jr. et al. | 706/12 |
| 6,539,376 B1 | 3/2003 | Sundaresan et al. | 707/5 |
| 6,553,365 B1 | 4/2003 | Summerlin et al. | 707/2 |
| 6,571,225 B1 | 5/2003 | Oles et al. | 706/12 |
| 7,003,517 B1 * | 2/2006 | Seibel et al. | 707/6 |
| 2001/0034738 A1 | 10/2001 | Cantwell et al. | 707/500 |
| 2002/0031260 A1 | 3/2002 | Thawonmas et al. | 382/190 |
| 2002/0069079 A1 | 6/2002 | Vega | 705/1 |
| 2002/0129066 A1 | 9/2002 | Milward et al. | 707/523 |
| 2002/0147599 A1 | 10/2002 | Vishnubhotla | 705/1 |
| 2002/0194148 A1 * | 12/2002 | Billet et al. | 706/62 |
| 2003/0046093 A1 | 3/2003 | Erickson et al. | 705/1 |
| 2003/0115080 A1 | 6/2003 | Kasravi | 705/1 |
| 2003/0120477 A1 | 6/2003 | Kruk et al. | 704/2 |
| 2003/0120528 A1 | 6/2003 | Kruk et al. | 705/7 |
| 2003/0130878 A1 | 7/2003 | Kruk et al. | 705/7 |
| 2003/0217333 A1 * | 11/2003 | Smith et al. | 715/513 |
| 2006/0004731 A1 * | 1/2006 | Seibel et al. | 707/3 |

FOREIGN PATENT DOCUMENTS

| | | |
|---|---|---|
| WO | WO 02/79937 A2 | 3/2002 |

OTHER PUBLICATIONS

"NTT Completes Roll Out . . . Procurement Costs", Business Wire, p0201, Dec. 15, 1998, pp. 1-2.*

Kasravi; "Text-Mining in Engineering"; 8th ISPE International Conference on Concurrent Engineering: Research and Applications; XP002353745; pp. 1-8, Jul. 28, 2001-Aug. 1, 2001.

Kim et al.; "Acquisition of Linguistic Patterns for Knowledge-Based Information Extraction"; IEEE Transactions on Knowledge and Data Engineering, vol. 7 No. 5; XP002353741; pp. 713-724, Oct. 1995.

Feldman et al.; "Knowledge Management: A Text Mining Approach"; PAKM 98, XP002353747Basel, Switzerland; pp. 9-1 to 9-10, Oct. 29-30, 1998.

Notification of Transmittal of the International Search Report or the Declaration (PCT Rule 44.1) mailed Feb. 11, 2004 (6 pages) re International Application No. PCT/US 02/339774, Filed Oct. 23, 2002.

Notification of Transmittal of the International Search Report or the Declaration (PCT Rule 44.1) mailed Feb. 2, 2004 (5 pages) re International Application No. PCT/US 02/33978, Filed Oct. 23, 2002.

Notification of Transmittal of the International Search Report or the Declaration (PCT Rule 44.1) mailed Feb. 20, 2004 (6 pages) re International Application No. PCT/US 02/33979, Filed Oct. 23, 2002.

Gale Group Trade and Industry, "Who's Using Whom?", Chain Store Age Executive With Shopping Center Age, 2 pages, Nov. 2001.

Business Wire, "EC-Content Announces New Offerings and Services," E-Marketplaces, p. 2362, 3 pages, Sep. 18, 2000.

Business Wire, "NTT Completes Roll Out of Trade'ex Procurement; Internet Based eProcurement Solution Streamlines Purchasing Process and Significantly Lowers Total Operational Costs," p. 0201, 2 pages, Dec. 15, 1998.

Rugullies, E., "Workflow: A must for Your Internet Procurement Solution," e-Business Advisor, Jun. 1999, 3 pages.

Ariyachandra et al., "Data Warehousing Stages of Growth," The Dialog Corporation, Jun. 1, 2001, 10 pages.

Nachtwey, Don, "Within Plain Sight," Intelligent Enterprise, vol. 3, n.12, p. 46, 1 page, Aug. 1, 2000.

Caesar, Felix, "The Impact of Followership as Related to . . . ," Walden University (0543), vol. 59/07, p. 2597, 1 page, 1998.

Jeffrey M. Kruk et al., "Text Mining for Gold," iSource Business, pp. 18 and 20, 2 pages, Oct. 2001.

* cited by examiner

FIG. 3A

Global Purchasing

MY REPORTS    CREATE REPORT    PREFERENCES                    Navigate Our Site ▼

Supplier Contract Review                                                    Back Document ▼

Supplier Spend                                                          104

| Master Supplier | Supplier | Payment Year Metrics | 2002 Total Spend | 2001 Total Spend | 2000 Total Spend |
|---|---|---|---|---|---|
| Total | Total | | $126,808,619 | $305,643,723 | $59,709,969 |
| | ABC, INC. CAPITAL CORPORATION | | $1,134,516 | $1,733,256 | $232,401 |
| ABC, INC. | ABC, INC. | | $125,674,103 | $303,884,967 | $59,371,011 |
| | BIG SYSTEM CORP | | | $25,500 | $27,132 |
| | AAA COMMUNICATIONS CORP | | | | $79,425 |

106

Supplier Contract Documents                                             108

| Supplier | Effective Date | Document Title | Filename |
|---|---|---|---|
| | 08/23/00 | AMENDMENT NUMBER ONE TO GLOBAL ALLIANCE AGREEMENT | Amendment #1 to Global Alliance Agreement.doc ← 112 |
| ABC, INC. | 05/17/99 | XYZ CORPORATION GLOBAL ALLIANCE AGREEMENT | Global Alliance Agreement.doc |

TO FIG. 3B

Supplier Contract Events

| Event Type | Effective Date | Document Title | Event Language |
|---|---|---|---|
| | | | 31.3 With respect to any such Affiliate, and upon ABC, INC's receipt of written notice from XYZ and such Affiliate, the license or other agreement governing the use and support of such products shall automatically be deemed to have been assigned to XYZ, provided, however, that such assigned license or other agreement shall be superseded by, and the use and support of the products shall be governed by, the terms and conditions of this Agreement. |
| ASSIGNMENT | 05/17/99 | XYZ CORPORATION GLOBAL ALLIANCE AGREEMENT | 31.4 With respect to any third party with which XYZ either (i) buys, leases, or otherwise acquires all or a substantial part of the assets or business of such third party, or (ii) consolidates with or merges with said third party, the license or other agreement governing the use and support of such products shall automatically be deemed to have been assigned to XYZ, provided, however, that such assigned license or other agreement shall be superseded by, and the use and support of the Products shall be governed by, the terms and conditions of this Agreement. |
| | | | 33.3 ASSIGNMENT. This Agreement shall be binding on the parties and their respective successors in interest and assigns. Neither party shall have the power to assign this Agreement |

110

FROM FIG. 3A

*FIG. 3B*

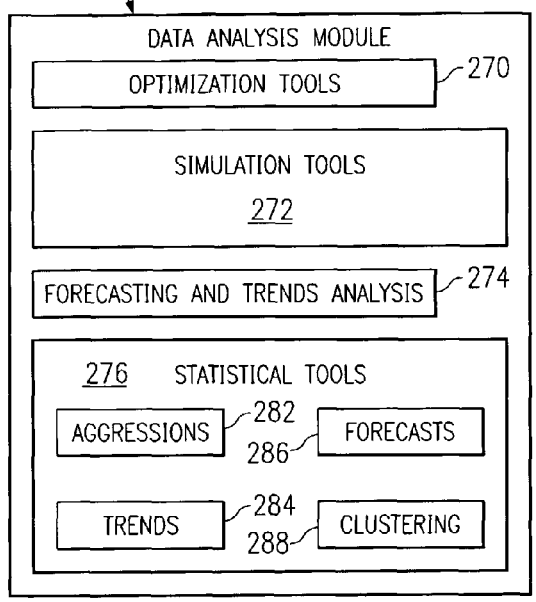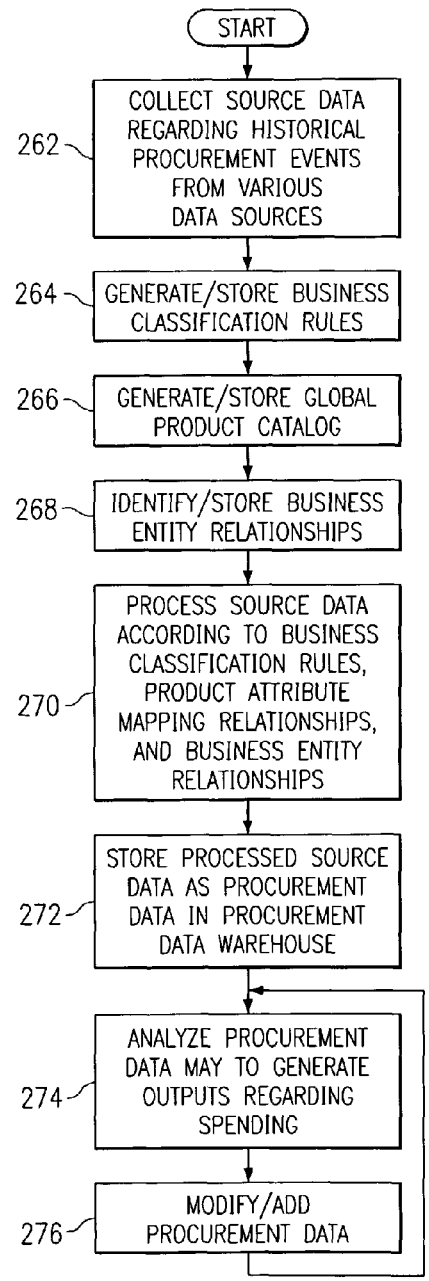

FIG. 15

| Global Purchasing | | | | | |
|---|---|---|---|---|---|
| MY REPORTS  CREATE REPORT  PREFERENCES | | | | | Navigate Our Site ▼ |
| Hardware - OEM "Free" Shipping Savings | | | | | Back |
| Report ▼  View ▼  Data ▼  Format ▼ | | | | | Last Update: 8/7/02 1:03:00 PM |
| PAGE BY: none — 604 | | | | | |
| Autostyle: Agent ▼ | | | | | |
| DRILL | | | | | |
| From: Supplier Short Name | | | | | |
| To: ▼ More options... | | | | | Rows: 8  Columns: 4 [?] [X] |

| Supplier Short Name | Metrics | | | | |
|---|---|---|---|---|---|
| | ☐ OEM Losses | ☐ OEM Savings 610 | ☐ OEM % Savings 614 | ☐ OEM Spend 612 | |
| Total 606 | 608 $ 2,236,258 | $ 2,282,179 | 2.71% | $ 82,630,436 | ←602 |
| ☐ SUPPLIER A | $ 2,075 | $ 1,181 | 2.72% | $ 43,450 | |
| ☐ SUPPLIER B, DIVISION A | $ 60,880 | $ 61,185 | 2.77% | $ 2,196,230 | |
| ☐ SUPPLIER C | $ 1,302,119 | $ 1,562,767 | 2.79% | $ 55,609,176 | |
| ☐ SUPPLIER D | $ 325,077 | $ 558,341 | 2.98% | $ 18,746,755 | |
| ☐ SUPPLIER D, DIVISION XYZ | $ 15,047 | $ 41,960 | 0.54% | $ 2,802,852 | |
| ☐ SUPPLIER E | $ 92,840 | $ 55,687 | 1.60% | $ 3,195,355 | |
| ☐ SUPPLIER F | $ 893 | $ 1,058 | 2.89% | $ 36,618 | |

The data used for reporting includes purchase payments (money paid) through June 2002.

SYSTEM AND METHOD FOR MANAGING SUPPLIER INTELLIGENCE

RELATED APPLICATION

This application claims the benefit of U.S. Provisional Patent Application Ser. No. 60/344,440, entitled "BANK OF KNOWLEDGE," filed Oct. 23, 2001, which is hereby incorporated by reference.

TECHNICAL FIELD OF THE INVENTION

This invention relates in general to supply chain management and, more particularly, to a system and method for managing supplier intelligence associated with a procurement process.

BACKGROUND OF THE INVENTION

Financial pressures continue to provide business executives with opportunities to reduce expenses while generating revenue growth. Procurement decisions, such as purchasing decisions regarding particular products, suppliers, and shipping of purchased products, often have a substantial impact on a business organization's financial bottom line, providing opportunities for reducing expenses as well as increasing revenue. In addition, such procurement decisions often influence the organization's general operation and the quality of goods or services procured by the organization.

Procurement decisions are often complex and involve the analysis of heterogeneous information, which may be constantly evolving, over a period of time. For example, such information may include large volumes of product data, purchaser (or client) requirements, supplier constraints, legal regulations and contractual terms and obligations. Contractual terms and obligations may originate from contracts between the business organization and its various suppliers. Some business organizations may deal with hundreds or even thousands of suppliers, and may therefore have hundreds or thousands of supplier contracts active at any particular time. These supplier contracts define the business terms and conditions between the business organization and the many suppliers.

SUMMARY OF THE INVENTION

In accordance with the present invention, systems and methods for managing supplier intelligence associated with a procurement process are provided.

According to one embodiment, a method of managing supplier intelligence is provided. The method includes collecting procurement data regarding a procurement process from a plurality of data sources. The procurement data includes information regarding a plurality of business divisions of a business entity. The method further includes generating, for each business division, a set of spend formulas for determining spending associated with that business division. The method further includes generating a set of supplier intelligence business rules based on a variety of business parameters. Each supplier intelligence business rule may interrelate at least one spend formula associated with a first one of the business divisions with at least one spend formula associated with a second one of the business divisions. The method further includes automatically analyzing at least a portion of the procurement data based on one or more of the set of supplier intelligence business rules to determine the financial effects of a decision made by the first business division on the second business division. The method further includes automatically generating a visual output indicating the results of the analysis.

According to another embodiment, a system for managing supplier intelligence is provided. The system includes a data warehouse, a supplier intelligence business rules database, an analysis module, and a data visualization module. The data warehouse is operable to collect procurement data regarding a procurement process, including information regarding a plurality of business divisions of a business entity, from a plurality of data sources. The supplier intelligence business rules database operable to store a set of supplier intelligence business rules generated based on a variety of business parameters and interrelating spend formulas associated with a various ones of the business divisions. The analysis module is operable to analyze at least a portion of the procurement data based on one or more of the set of supplier intelligence business rules to determine the financial effects of a decision made by the first business division on the second business division. The data visualization module is operable to generate a visual output indicating the results of the analysis.

Various embodiments of the present invention may benefit from numerous advantages. It should be noted that one or more embodiments may benefit from some, none, or all of the advantages discussed below.

One advantage is that supplier intelligence systems and methods may be provided for managing a large volume of supplier management information, including information regarding multiple suppliers, contractual issues, international regulations, new products and services, particular business needs and human elements, for example, in order to assist various procurement decision-makers in making procurement decisions.

In particular embodiments, a large volume of information, such as products, prices, multiple purchase orders, geography, inventory and shipping costs, for example, may be automatically analyzed to optimize procurement decisions in real time according to a set of heuristics and business rules. For example, a supplier intelligence system may be operable to analyze the effects that decisions made by particular spend categories or divisions of a business entity have on each other based on a total-cost-of-ownership view. In this matter, the supplier intelligence system may be operable to analyze a supply chain more effectively than previous or existing systems.

Another advantage is that supplier intelligence systems and methods may be operable to analyze procurement data regarding each spending division, or silo, of a business organization. For example, a particular supplier intelligence system may be operable to analyze a complete procurement process, or supply chain, including the spending behaviors of each spending division of the business organization. Such analyses may include performing a variety of simulations based on a set of hypothetical procurement decisions in order to optimize particular procurement or supplier management decisions.

Yet another advantage is that the supplier intelligence system may be operable to determine the financial effects of decisions made by particular spending divisions on other spending divisions. Often, particular spending divisions of a business organization often make decisions that are financially advantageous to that division, without realizing various negative financial effects of their decisions on other divisions of the business entity, or on the total cost associated with the procurement process or supply chain. By analyzing the total-cost-of-ownership associated with a procurement process or supply chain, the supplier intelligence system may be operable to identify such financial relationships between particular divisions or silos of the business organization and to suggest particular procurement decisions accordingly. Such systems and methods may be more effective, efficient, faster and/or less expensive than previous systems and methods of managing supplier information and procurement decisions.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 3A-3B illustrate a display of an example output generated by the contracts management component of FIG. 2;

FIG. 7 illustrates an example data analysis module for use in the spend management component of FIG. 6;

FIG. 8 illustrates an example method of managing procurement spending in accordance with an embodiment of the present of the invention;

FIG. 14 illustrates an example method of managing supplier intelligence in accordance with an embodiment of the present invention; and FIG. 15 illustrates a display of an example output generated by the supplier intelligence component of FIG. 13.

DETAILED DESCRIPTION OF THE DRAWINGS

Example embodiments of the present invention and their advantages are best understood by referring now to FIGS. 1 through 15 of the drawings, in which like numerals refer to like parts.

Figure 1:
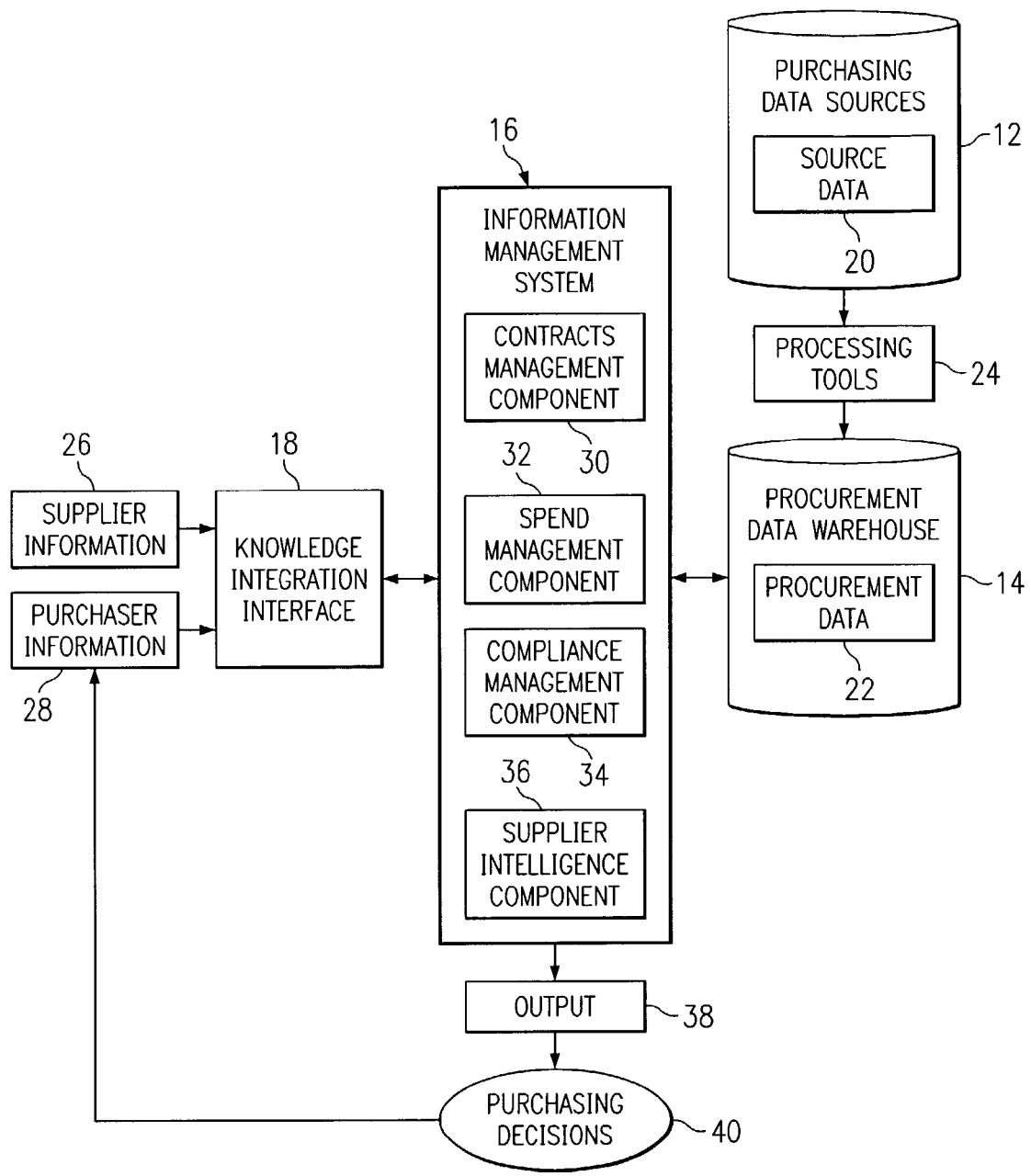
FIG. 1 illustrates an example procurement data management system in accordance with an embodiment of the present invention.

FIG. 1 illustrates an example procurement data management system 10 in accordance with an embodiment of the present invention. In general, system 10 is operable to facilitate procurement decisions by extracting, integrating, analyzing, and disseminating business-critical information from a variety of heterogeneous information sources. In particular embodiments, system 10 is operable to extract procurement information from multiple sources, collect the data into a common data warehouse, compare current business events (such as purchases, for example) with information in the common data warehouse in order to generate business recommendations or discover business opportunities. In a particular embodiment, system 10 is operable to extract otherwise hidden value from both existing, as well as new, businesses. For example, system 10 may be operable to supply decision-makers with inferences and information that is otherwise hidden, enabling such decision-makers to make better procurement decisions based on a large collection of information.

As shown in FIG. 1, procurement data management system 10 may include one or more purchasing data sources 12, a procurement data warehouse 14, an information management system 16, and a knowledge integration interface 18. Information management system 16 comprises various components, including a contracts management component 30, a spend management component 32, a compliance management component 34, and a supplier intelligence component 36.

Purchasing data sources 12 may be operable to store, or otherwise have access to, various source data 20 regarding any number of historical procurement events and/or business entities. The terms "business entity" and "business organization" as used throughout this document includes any individual or group of individuals associated with any type of for-profit or non-profit business enterprise.

Purchasing data sources 12 may include operational applications, manual source data applications (such as spreadsheet files, for example) and/or various other data sources suitable to store or have access to information regarding procurement events. In some embodiments, purchasing data sources 12 may include one or more databases or applications operable to support operational systems. For example, a particular purchasing data source 12 may include an on-line transaction processing (OLTP) system, a teleprocessing monitor, a data management system (such as a DB2, ORACLE, or SYBASE system, for example) and may have capabilities for on-line data entry and batch processing. In particular embodiments, source data 20 associated with purchasing data sources 12 generally includes structured, as opposed to unstructured, data. It should be understood that various purchasing data sources 12 may be physically and geographically distributed.

Source data 20 may include information from purchase orders (such as information regarding suppliers, products, prices, refunds, rebates, margins, and dates, for example), invoices, general ledger account information (such as general ledger account codes, for example), a listing of procured products and services, where such procurements are made, who is responsible for making such procurements, payment information, and any other type of information regarding historical procurement events. It should be understood that the term "products" as used throughout this document includes both goods and services, whether or not accompanied by the term "services."

Procurement data warehouse 14 may include a collection of procurement data 22, which may include source data 20 received from one or more purchasing data sources 12. As shown in FIG. 1, one or more processing tools 24 may be used to facilitate the transportation of such source data 20 from purchasing data sources 12 to procurement data warehouse 14. Processing tools 24 may include data extraction, transformation, and loading (ETL) tools operable to extract source data 20 from purchasing data sources 12, transform or otherwise process such source data 20, and load such source data 20 into procurement data warehouse 14. Such ETL tools are described in greater detail below with reference to ETL tools 220 of FIG. 6. Processing tools 24 may also include one or more additional tools operable to process source data 20, such as various data mapping and classification tools, as described in greater detail below with reference to data processing sub-system 202 of FIG. 6.

Procurement data 22 may also include data received from information management system 16. For example, procurement data 22 may include data extracted from electronic procurement contracts by contracts management component 30 of information management system 16, as discussed below in greater detail. It should be understood that procurement data warehouse 14 may be operable to exchange various information with information management system 16 in order to generate outputs 38 enabling users (such as procurement decision-makers, for example) to make better purchasing decisions, indicated by reference numeral 40. It should be understood that the term "user" as used throughout this document refers to any person or group of people associated with a procurement process or business entity, such as business rule experts, subject matter experts, business analysts, data analysts, managers, system administrators, purchasing or spending decision-makers, or business consultants, for example.

Knowledge integration interface 18 may be operable to bring together supplier information 26, purchaser information 28, and the various components of information management system 16 in order for such information to be processed to generate various outputs 38. In particular embodiments, knowledge integration interface 18 includes an interface and a set of utilities and routines that bring together supplier information 26, purchaser information 28 and the components of information management system 16. For example, knowledge integration interface 18 may be operable to receive or extract particular supplier information 26 and determine where to route the particular supplier information 26 such that the supplier information 26 may be presented to a user in a format such that the user may discover hidden value or particular business opportunities.

Supplier information may include various information regarding any number of suppliers, such as spending patterns with particular suppliers, information regarding supplier alignment, and information regarding compliance and/or non-compliance with agreements made between particular suppliers and the purchasing organization, for example.

Purchaser information may include various information regarding the purchasing business organization, such as information regarding particular business opportunities, such as information regarding opportunities for reducing expenses and/or generating revenue.

Figure 2:
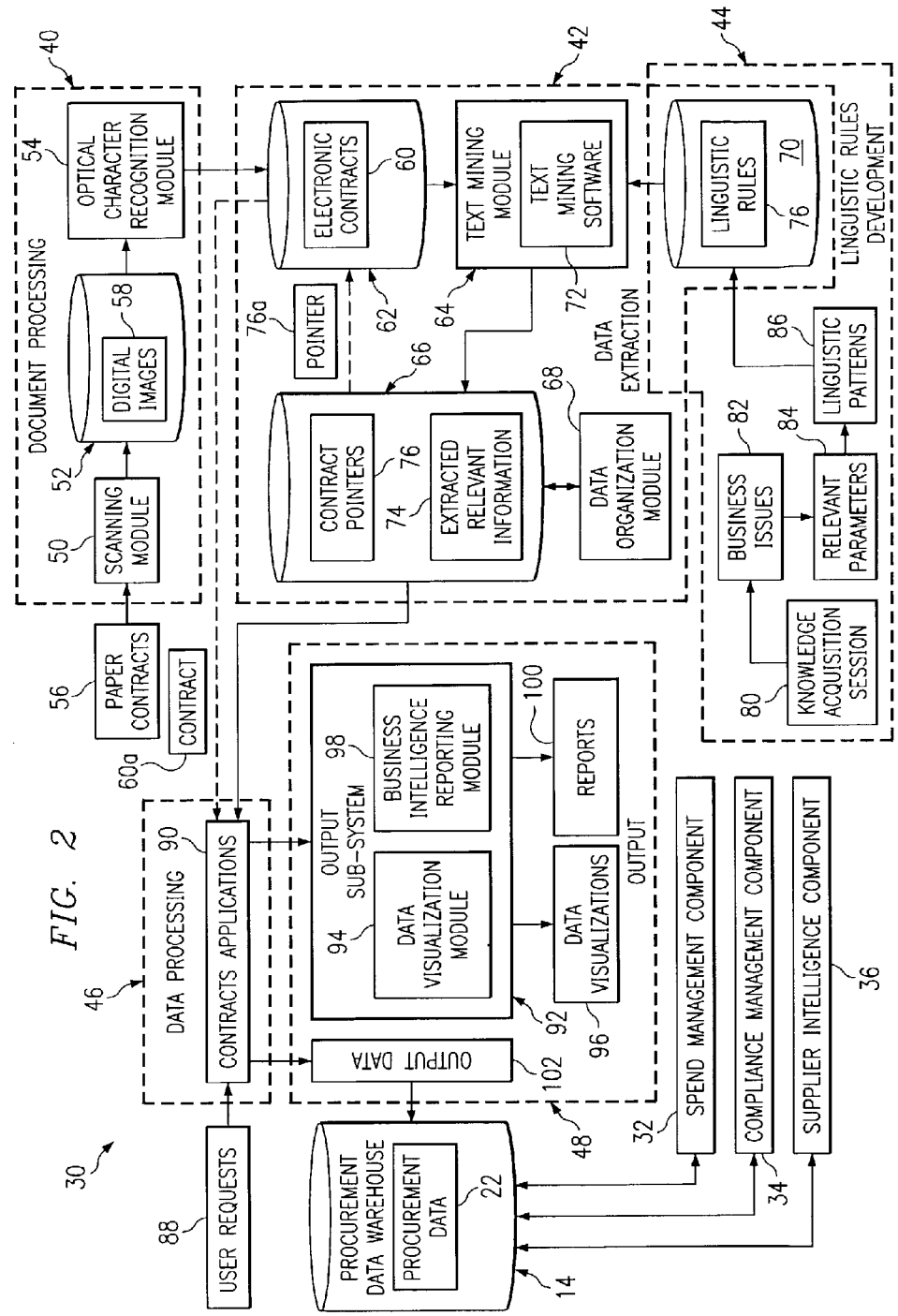
FIG. 2 illustrates an example architecture and operation of a contracts management component of the procurement data management system of FIG. 1.

FIG. 2 illustrates an example architecture and operation of contracts management component 30 of system 10 in accordance with an embodiment of the present invention. Contracts management component 30 may include one or more various sub-components. For example, in the embodiment shown in FIG. 2, contracts management component 30 includes a document processing sub-component 40, a data extraction sub-component 42, a linguistic rules development sub-component 44, and a data processing sub-component 46. Document processing sub-component 40 may be generally operable to convert (by digitizing) paper contracts into electronic contracts. Data extraction sub-component 42 may be generally operable to extract relevant information from the digitized electronic contracts based on a set of linguistic rules. Linguistic rules development sub-component 44 may be generally operable to analyze business issues to determine such linguistic rules. Data processing sub-component 46 may be generally operable to analyze information extracted by data extraction sub-component 42 to generate various types of output, indicated generally by reference numeral 48.

Document processing sub-component 40 may include a scanning module 50, a digital images database 52, and an optical character recognition module 54. Scanning module 50 may be operable to scan or otherwise process one or more paper contracts 56 to generate digital images 58 of the one or more paper contracts 56. Digital images 58 may be stored in digital images database 52. Paper contracts 56 may include contracts stored on paper, microfiche, microfilm, aperture card, or any other format in which the text of the contracts is not computer-editable. Optical character recognition module 54 is operable to convert the digital images 58 associated with each paper contract 56 into an electronic contract 58, such that the text of the electronic contract 60 is computer-editable. For example, optical character recognition module 54 may convert digital images 58 into electronic contracts 60 based on patterns of pixels in digital images 58. Each electronic contract 60 may be stored in an electronic contracts database 62 of data extraction sub-component 42. It should be understood that electronic contracts 60 comprise computer-editable, but unstructured, text.

Data extraction sub-component 42 may include electronic contracts database 62, a text mining module 64, an extracted information database 66, a data organization database 68, and a linguistic rules database 70. As discussed above, electronic contracts database 62 is operable to store electronic contracts 60 received from document processing sub-component 40. Text mining module 64 may include text mining tools, or software, 72 and may be operable to analyze electronic contracts 60 to extract relevant information 74 based on a set of linguistic rules 76 stored in linguistic rules database 70. Text mining tools 72 may be operable to automatically identify, group, and map key concepts within a large volume of unstructured textual data. Text mining tools 72 may include lexical processing and information clustering operable to extract key phrases and identify relevant relationships within electronic contracts 60.

In particular embodiments, text mining tools 72 may include Natural Language Processing (NLP) technologies to extract relevant information 74. Using NLP technologies, documents may be transformed into a collection of concepts, described using terms discovered in the text. Thus, text mining tools 72 may be operable to extract more information than just picking up keywords from textual data. For example, text mining tools 72 may be operable to extract facts, determine their meaning, resolve ambiguities, and determine an author's intent and expectations.

In particular embodiments, text mining tools 72 may include software developed for use in contracts management component 30 and/or may include one or more commercially available software products, such as text mining software available from CLEARFOREST CORP. It should be understood that the term "text mining" as used throughout this document includes both data mining and text mining. In other words, "text mining" is intended to refer to the extraction of particular information from both data and unstructured text (or "free text"). Thus, for example, text mining module 64 may be operable to extract relevant information 74 from both data and text.

Data organization module 68 may be operable to organize and/or otherwise process extracted information 74 stored in extracted information database 66. Such organization and/or other processing may include sorting, categorizing, filtering, cleansing, merging, or deleting information, for example.

Extracted information database 66 may also include one or more contract pointers 76. Each contract pointer 76 may be linked to one or more particular portions or items of extracted information 74 and may point to one or more corresponding electronic contracts 60, or portions of one or more electronic contracts 60, stored in electronics contracts database 62. For example, a particular contract pointer 76 may be linked to a particular contract term included within extracted information 74 and may point to the specific clause in a particular electronic contract 60 from which the particular contract term was extracted. In particular embodiments, contract pointers 76 may be generated by text mining module 64 or data organization module 68.

Linguistic rules 76 include logical constructs, or statements, that may be used to analyze textual information, or data, in natural language format, such as text in English, French or Japanese, for example. The extraction of relevant information 74 from electronic contracts database 62 using text mining tools 72 may include both syntactic analysis as well as semantic analysis. Thus, linguistic rules 76 may be provided for performing both syntactic analysis and semantic analysis.

Syntactic analysis includes identifying or understanding the location of particular pieces of information, such as characters or words, for example. Thus, an example linguistic rule at the syntactic level may search for blank spaces between characters in order to locate each word in a group of words. As another example, syntactic linguistic rules may be used to locate particular parts of speech, such as verbs, nouns and adjectives, within a group of words. As yet another example, linguistic rules concerning syntactic analysis may utilize a dictionary to check and/or correct spellings of particular words.

Semantic analysis involves trying to understand the meaning of a word or group of words, such as a phrase, sentence or paragraph, for example. Example linguistic rules 76 at the semantic level may utilize a dictionary to understand the meaning of particular words. Semantic linguistic rules 76 may also utilize a thesaurus to look up synonyms to extend the semantic analysis.

Each linguistic rule 76, including both syntactic and semantic rules, may perform either shallow parsing or deep parsing. Shallow parsing involves analysis limited to a single sentence, while deep parsing involves analysis extending across more than one sentence or paragraph. Deep parsing may be used to resolve ambiguities in a particular text. For example, linguistic rules designed for deep parsing may be able to distinguish between the use of the word "acquisition" to refer to a business relationship ("company A is in acquisition discussions with company B") or to a product ("company A manufactures data acquisition systems") by analyzing one or more prior and/or subsequent statements to resolve the ambiguity.

Linguistic rules 76 may be designed to extract one or more pieces or items of information related to a particular business issuer or parameter from an electronic contract 60. For example, one or more linguistic rule 76 may be designed to extract telephone/fax number information from an electronic contract 60, which may include information concerning each identified telephone/fax number, such as the number itself, whether the number is for a home phone, office phone, cellular phone, mobile phone, or fax machine, and the name of the person and/or company associated with the number. First, one or more linguistic rules may be designed to locate each telephone/fax number within the electronic contract 60. For example, such linguistic rules 76 may look for any three consecutive numbers followed by a dash or period and followed by four consecutive numbers. The linguistic rules 76 may also look at the text preceding the first three numbers to identify three additional consecutive numbers that may be located within parenthesis or followed by a period or hyphen. Such linguistic rules 76 may be used to extract telephone or fax numbers from electronic contract 60. One or more additional linguistic rules 76 may then be used to identify the type of each identified telephone or fax number. For example, one or more linguistic rules 76 may be designed to search the five words prior and subsequent to each identified number for words identifying the type of each identified number, such as "office," "home," "cell," "mobile," "pager," "fax" or "facsimile," for example. One or more additional linguistic rules 76 may also be used to identify a person and/or company associated with each identified number. For example, one or more linguistic rules 76 may be designed to search the sentence prior to and subsequent to each identified number for any person or company name. Thus, such linguistic rules 76 may be used to extract various information associated with each identified telephone or fax number. Such information may be linked and/or stored together within extracted information database 66.

Automatically extracting relevant information 74 from electronic contracts database 62 using text mining tools 72 based on linguistic rules 76 allows the extraction of relevant information from a large volume of unstructured text and/or data sources in a relatively small period of time, and avoids the need to manually search such information to extract the relevant portions. For example, in particular embodiments, text mining module 64 may be operable to extract relevant information 74 from several thousand electronic supplier contracts 60 within a few hours, based on various factors such as the size of the electronic contracts 60 as well as the number and complexity of linguistic rules 76, for example.

Linguistic rules 76 may be developed or generated by linguistic rules development sub-component 44. One or more knowledge acquisition sessions, indicated by reference numeral 80, may be used to identify one or more business issues, or needs, 82. Each knowledge acquisition session 80 may include a structured interview designed to understand a particular business process, as well as why the particular business process is performed in a particular manner. For example, a particular knowledge acquisition session 80 regarding a procurement or supply management process may include an interview to discern the details of the process, as well as why the process is performed in a particular manner, in order to identify a set of relevant business issues 82.

Business issues 82 may include a variety of issues associated with a particular business process, which may include a variety of issues regarding contracts associated with that business process. For example, in a situation concerning a procurement process and procurement contracts, business issues 82 may include issues such as financial obligations, rebate opportunities, refund opportunities, margin opportunities, type of license (such as software, for example), volume commitment, warranty period, term of agreement, transfer of license terms, authorized agency terms, maintenance notices, pricing, and contract termination notification, for example.

One or more relevant business parameters 84 may be identified for each business issue 82. For example, supposing margin opportunities is identified as a business issue 82, one or more parameters relevant to identifying and/or describing particular margin opportunities associated with a set of contracts may be identified as relevant parameters 84. Such relevant parameters 84 may include the name of the supplier, the name of the product, and the amount of the margin, for example.

One or more linguistic patterns 86 may then be identified for each identified relevant parameter 84. For example, supposing telephone number has been identified as a relevant parameter 84, the associated linguistic patterns 86 may include the pattern of three consecutive numbers followed by a hyphen or period and further followed by four consecutive numbers, as well as the pattern concerning the presence of particular words such as "phone," "telephone," "fax," "facsimile," "cell," "mobile," "office," and "home" located within a particular number of words before and/or after a group of consecutive numbers, for example.

One or more linguistic rules 76 may then be generated, or written, for each identified linguistic pattern 86 in order to extract relevant information 74 regarding each relevant parameter 84 from electronic contracts 60 stored in electronic contracts database 62. Linguistic rules 76 may be developed, tested, and revised using an iterative process, such as described in greater detail below, with reference to FIG. 4.

Data processing sub-component 46 may be operable to process and/or analyze extracted information 74 in order to generate various types of output 48. As shown in FIG. 2, data processing sub-component 46 may include one or more contracts applications 90.

Contracts applications 90 may be operable to receive extracted information 74 and/or electronic contracts 62 (or portions thereof, such as particular sentences, clauses or paragraphs, for example) from electronic contracts database 62 and to process such information to generate one or more various outputs 48. In particular embodiments, contracts applications 90 are operable to generate various outputs 48 based on requests 88 received from users, such as business analysts, for example.

Contracts applications 90 may also be operable to identify business opportunities associated with a procurement process. In particular embodiments, contracts applications 90 may be operable to analyze particular procurement data 22 with respect to particular extracted information 74 to determine whether a business opportunity is available. For example, contracts applications 90 may be operable to compare particular extracted information 74 regarding rebate opportunities from a particular supplier and particular procurement data 22 regarding purchases made form that supplier in order to discover potential or existing rebate opportunities. For example, if a particular supplier, Supplier A, contract specifies a rebate for spending $20,000 on product X, contracts applications 90 may be operable to identify, from analyzing procurement data 22 to determine the amount spent on product X from Supplier A, whether the rebate opportunity is available. In a particular embodiment, contracts application 90 may also be operable to generating a notification if it is determined that the business opportunity is available, and to communicate the opportunity notification to appropriate individuals (such as procurement managers, for example) or business entities.

In this manner, various business opportunities may be automatically identified by contracts management component 30 based on extracted information 74 that may not be efficiently identified by human management of supplier contracts. Such business opportunities may include opportunities to reduce costs (such as by obtaining or enforcing discounts, for example), to increase revenue generation (such as by obtaining or enforcing refunds, rebates or margins, for example) and to reduce legal exposure due to non-compliance with contractual terms, for example.

As shown in FIG. 2, contracts applications 90 may be associated with, or coupled to, an output sub-system 92 operable to generate various types of visual outputs that may be analyzed or interpreted by users, such as business analysts. In particular embodiments, output sub-system 92 includes a data visualization module 94 operable to generate various data visualizations 96 and a business intelligence reports 98 operable to generate business intelligence reports 100.

Data visualizations 96 may include two-dimensional and three-dimensional visualizations, such those illustrated by FIGS. 3A-3B, 9A, 9B, 11 and 15, and may include a plurality of such visualizations through which a user may navigate using one or more navigation tools. Such navigation tools may be provided by contracts applications 90 or any other suitable application, and may include on-line browsers and search engines, for example. Data visualizations 96 may illustrate one or more areas of business opportunity which may be analyzed by a user, such as a business analyst, in order to further filter and isolate complex data in a manner that reveals particular patterns (such as spend patterns, for example) or business opportunities, such as described above regarding the rebate opportunity example. For example, a particular data visualization 96 may include a graph illustrating discount information regarding procurements from a particular supplier that may be analyzed by a business analyst to discover potential discount opportunities.

Business intelligence reports 100 may include textual reports (which may include pictorial representations) generated by business intelligence reporting module 98. In a particular embodiment, contracts applications 90 are operable to receive a request 88 from a user based on the user's analysis of a particular data visualization 96, for example, and to communicate with business intelligence reporting module 98 to generate an appropriate business intelligence report 100 based on particular extracted information 74 and/or electronics contracts 60 (or portions thereof).

In particular embodiments, output sub-system 92 is operable to provide searching or navigation tools allowing users to search or browse various outputs 48, such as data visualizations 96 and/or business intelligence reports 100. For example, in particular embodiments, output sub-system 92 may include a browser and/or a search engine allowing a user to search for particular contracts or portions of contracts and to view and navigate through the results of such searches.

In some embodiments, contracts applications 90 are operable to process extracted information 74 associated with a particular business parameter (such as a particular business issue 82 or relevant parameter 84, for example) in order to generate one or more particular outputs 48 (such as a data visualization 96 or business intelligence report 100) regarding that business parameter. For example, in a particular embodiment, contracts applications 90 are operable to receive, process and/or analyze particular extracted information 74 regarding potential rebates from a particular supplier in order to generate an output 48 that may be used to identify a rebate opportunity regarding a particular product.

As discussed above, contracts applications 90 may be operable to include electronic contracts 60 or portions of electronic contracts 60 (such as particular sentences, clauses or paragraphs of electronic contract 60a, for example) received from electronic contracts database 62 within various outputs 48. For example, as shown in FIG. 2, a particular contract pointer 76a may be used to point to a particular electronic contract 60 stored in electronic contracts database 62. The pointed-to electronic contract, shown as electronic contract 60a, may be forwarded to contracts applications 90 for processing. Contracts applications 90 may be able to include electronic contract 60a, or portions thereof, in a particular output 48. For example, contracts applications 90 may allow a user to browse such electronic contracts 60, or portions thereof, in order to identify relevant contract language, for example.

In addition to the various forms of output generated by output sub-system 92, contracts application 90 may be operable to generate output data 102 to be imported into procurement data warehouse 14. As shown in FIG. 2, procurement data warehouse 14 is associated with, or utilized by, each of spend management component 32, compliance management component 34 and supplier intelligence component 36 of system 10. Thus, in particular embodiments, as discussed below regarding FIGS. 6, 10 and 13, contracts management component 30 may be operable to extract relevant information 74 from electronic contracts 60 and process such extracted information 74 to generate output data 102 which may be used as an input by spend management component 32, compliance management component 34 and/or supplier intelligence component 36 of system 10. In an alternative embodiment, extracted information 74 may be received directly as input data by spend management component 32, compliance management component 34 and/or supplier intelligence component 36 of system 10 without being processed by contracts applications 90.

Contracts applications 90 and output sub-system (or particular functionalities thereof) may include separate entities or software modules or may be a collected set of modules, such as modules or functionalities provided by a particular software package, for example. For example, in a particular embodiment, data visualizations module 94 may comprise the software package MINDSET provided by SILICON GRAPHICS, INC., and contracts applications 90 and business intelligence reporting module 98 may comprise software modules or functionalities provided by a particular business intelligence software package provided by MICROSTRATEGY, INC.

FIGS. 3A-3B illustrate a display 104 of an example output 48 generated by contracts applications 90 and/or output sub-system 92 of contract management component 30 in accordance with an embodiment of the present invention. Display 104 illustrates a variety of information regarding procurements and contractual arrangements between a particular business entity, XYZ Systems, Inc., from a particular supplier, ABC, Inc. For example, display 104 includes a supplier spend section 106, a supplier contract documents section 108, and a supplier contracts event section 110.

As shown in FIG. 3A, supplier spend section 106 may be operable to display a summary of spending made by purchaser XYZ Systems, Inc. from supplier ABC, Inc. In particular embodiments, supplier spend section 106 includes output generated by spend management component 32 of system 10, as discussed below in greater detail with reference to FIG. 6.

Supplier contract documents section 108 may be operable to display a listing of each contract that defines a contractual arrangement between XYZ Systems, Inc. and ABC, Inc. In particular embodiments, such contracts may be identified, based on particular information 74 extracted from electronic contracts database 62, by contracts applications 90 and/or by spend management component 32 of system 10, as discussed below in greater detail with reference to FIG. 6.

As shown in FIG. 3B, supplier contracts event section 110 may be operable to display relevant portions, or clauses, of the contracts listed in supplier contract documents section 108. Such contract portions may specify the relevant terms and conditions of the contractual arrangement between XYZ Systems, Inc. and ABC, Inc. In particular embodiments, the contract portions, or clauses, may be retrieved form electronic contracts database 62 by one or more contract pointers 76 linked to particular extracted information 74 regarding XYZ Systems, Inc. and/or ABC, Inc.

Display 104 may be displayed by an interactive user interface, such as in a WINDOWS environment, for example, such that a user may navigate through the display and select particular details for further analysis. In particular embodiments, display 104 is presented by an Internet browser and includes various icons, pull-down menus and/or hypertext items (which may include underlined and/or colored text, for example) that may be selected by a user to retrieve additional information regarding particular items. For example, as shown in FIG. 3A, a user may select the hypertext item 112 labeled "Global_Alliance_Agreement.doc" to retrieve a display of the particular electronic contract 60 associated with that filename such that the user may browse through the text of that particular electronic contract 60.

Returning to FIG. 2, in operation, contracts management component 30 may periodically update its various databases and modules. It should be understood that events described throughout this document as occurring "periodically" include events that occur at regular, irregular or random intervals and/or events that are triggered by the occurrence of various other events. For example, electronic contracts module 62 may periodically receive new electronic contracts 60, such as electronic contracts 60 generated by document processing sub-component 40. Text mining module 64 may periodically analyze electronic contracts database 62 to extract new relevant information 74, to modify, replace, or delete existing relevant information 74 and/or to generate new or updated contract pointers 76.

In particular embodiments, text mining module 64 is operable to extract relevant information 74 from at least the new electronic contracts 60 each time one or more new electronic contracts 60 are added to electronic contracts database 62. In addition, text mining module 64 may be operable to extract new or updated relevant information 74 from some or all electronic contracts 60 stored in electronic contracts database 62 in response to a modification, addition or deletion of one or more linguistic rules 76 stored in linguistic rules database 70. Linguistic rules 76 may be added, deleted or modified periodically, such as when a new business issue 82 is identified, for example. In a particular embodiment, text mining module 64 is operable to "re-mine," or re-analyze all of the electronic contracts 60 stored in electronic contracts database 62 to extract a new set of relevant information 74 each time one or more new electronic contracts 60 are added to electronic contracts database 62. In this manner, the extracted information may be kept current and accurate.

Figure 4:
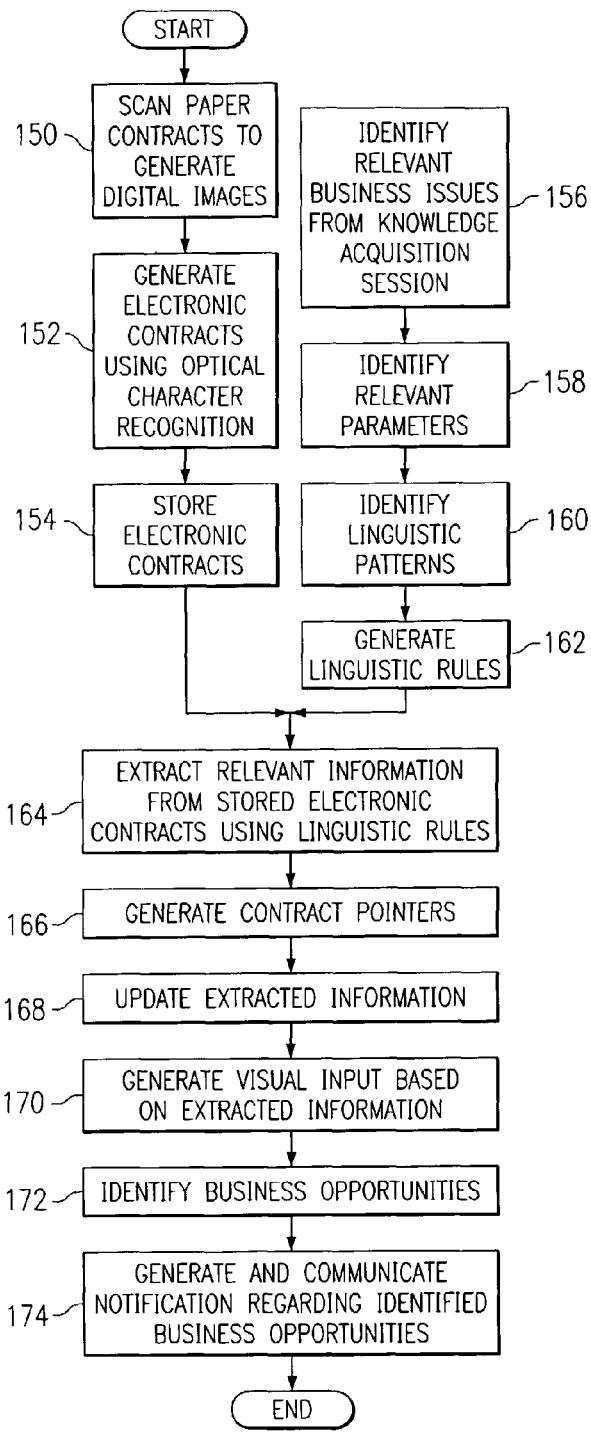
FIG. 4 illustrates an example method of managing contracts in accordance with an embodiment of the present invention.

FIG. 4 illustrates an example method of managing contracts in accordance with an embodiment of the present invention. At step 150, one or more paper contracts are scanned or otherwise processed to generate digital images of the paper contracts. At step 152, the digital images may be processed using optical character recognition (OCR) techniques to generate an electronic contract corresponding to each paper contract. At step 154, the electronic contracts are stored in an electronic contracts database.

At step 156, one or more business issues relevant to a particular business process are identified from a knowledge acquisition session. Such business issues may include business issues relevant to a procurement process, such as margin opportunities, rebate opportunities or discount opportunities, for example. At step 158, one or more relevant parameters are identified for each identified business issue. For example, the relevant parameters associated with a particular business issue may include product name, supplier name, price, quantity and relevant dates.

At step 160, one or more linguistic patterns are generated or identified for each identified relevant parameter. Such linguistic patterns may include textual patterns in the natural language associated with each relevant parameter. At step 162, one or more linguistic rules are written or generated based on the linguistic patterns identified at step 160.

At step 164, relevant information is extracted from the electronic contracts stored in the electronic contracts database based on the linguistic rules generated at step 162. In particular embodiments, the extracted information may be sorted, organized, or otherwise processed based on one or more of the linguistic rules. At step 166, one or more contract pointers may be generated to link particular pieces or items of the extracted information to corresponding electronic contracts, or portions of electronic contracts, stored in the electronic contracts database.

At step 168, the information stored in the extracted information database may be updated, which may include adding new information, updating particular information, removing particular information and/or replacing particular information, for example. For example, if new electronic contracts are added to the electronic contracts database, relevant information may be extracted from the new electronic contracts using the linguistic rules, and such extracted relevant information may be added to the extracted information database. As another example, if new linguistic rules are added, or if one or more of the existing linguistic rules are modified or removed, an updated set of relevant information may be extracted from the electronic contracts database based on the new or updated linguistic rules. Such extracted information may then be added to the extracted information database and/or may replace all or portions of the extracted information currently stored in the extracted information database.

At step 170, some or all of the extracted information stored in the extracted information database may be processed and/or analyzed in order to generate a visual output. In particular embodiments, particular extracted information may be processed in order to generate a particular visual output. The visual output may include one or more electronic contracts (or portions thereof) received from the electronic contracts database that are associated with the particular extracted information being processed. Such electronic contracts (or portions thereof) may be identified by one or more of the contract pointers generated at step 166 which link such electronic contracts (or portions thereof) with the particular extracted information being processed.

At step 172, it may be determined whether a business opportunity is available based on an analysis of the output generated at step 170. For example, a business analyst may determined whether a rebate or discount opportunity is available based on an analysis of a table, chart, graph or report generated at step 170. At step 174, a notification regarding an identified business opportunity may be generated and communicated to one or more business entities or employees, such as a procurement manager, for example.

In particular embodiments, steps 150 through 154 regarding converting paper contracts into electronic contracts may be optional. For example, such steps may not be performed if the electronics contracts database receives contracts from various sources already in electronic format.

Figure 5:
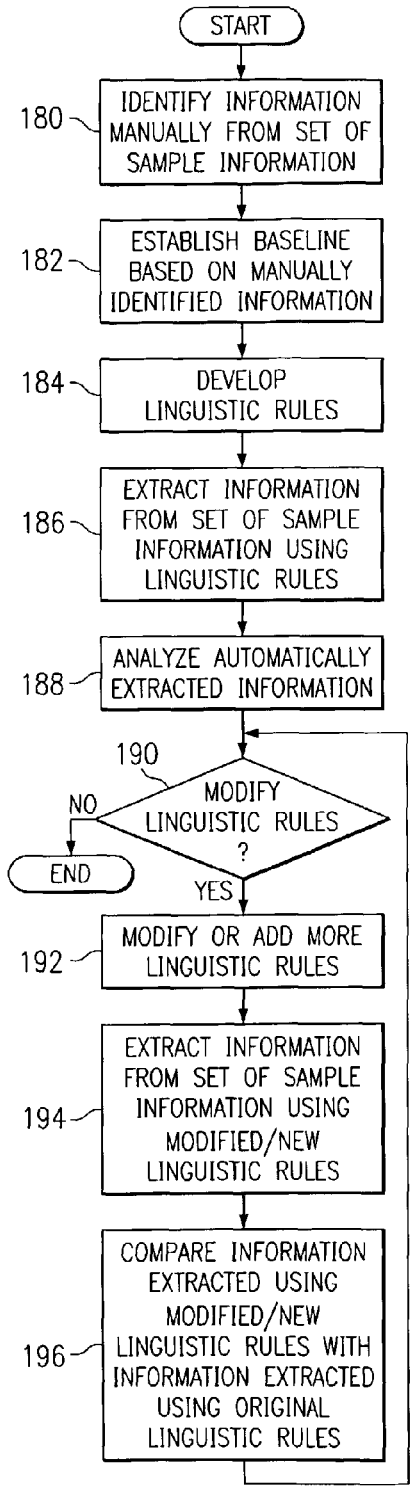
FIG. 5 illustrates an example method of developing, testing and modifying linguistic rules used to extract information from electronic contracts in accordance with an embodiment of the present invention.

FIG. 5 illustrates an example method of developing, testing, and modifying linguistic rules (such as linguistic rules 76, for example) in accordance with an embodiment of the present invention. At step 180, a set of sample information, such as a group of documents, is manually analyzed to identify information within the scope of a particular parameter. For example, a set of sample contracts may be manually analyzed to identify the number and textual locations of telephone numbers, product names, or company names. At step 182, a baseline may be established based on the results of the manual analysis performed at step 180, such as the number and textual location of each identified item of information falling within the scope of the selected parameter. For example, if a manual analysis was performed to identify telephone numbers in a set of sample information, the baseline may specify the number of manually identified telephone numbers, as well as each actual telephone number itself.

At step 184, one or more linguistic rules are developed or written based on linguistic patterns associated with the selected parameter in order to automatically identify information following within the scope of that parameter. In particular embodiments, such linguistic rules may be developed as described above with reference to FIGS. 2 and 4.

At step 186, the set of sample information is analyzed to automatically extract information regarding the selected parameter based on the one or more linguistic rules developed at step 184. At step 188, the results of the analysis performed at step 186 are analyzed. In particular embodiments, the information extracted at step 186 is compared with the baseline information determined at step 182 to determine the quality of the one or more linguistic rules.

In a particular embodiment, both the accuracy and the thoroughness of the automatically extracted information may be measured. Accuracy, or precision, represents a measurement (such as a percentage, for example) of the amount of automatically extracted information that matches the manually identified baseline information. For example, if ten sample items relating to a particular business parameter are manually identified and established as the baseline information, and the information automatically extracted based on the linguistic rules includes twelve items, eight of which match the manually identified sample items and four of which do not match the manually identified sample items, the accuracy of the automatically extracted information is $8/12$, or 66.7%. In contrast, thoroughness is a measure of the amount of the baseline information that is identified by the automatic extraction. Thus, in example provided above, since the automatically extracted information identified eight of the ten manually identified sample items, the thoroughness of the automatically extracted information is $8/10$, or 80%.

At step 190, it is determined whether to adjust one or more of the linguistic rules based on the analysis performed at step 188. In a particular embodiment, such determination may be based at least in part on the accuracy and thoroughness of the automatically extracted information determined at step 188.

If it is determined at step 190 to adjust one or more of the linguistic rules or to add one or more new linguistic rules, such linguistic rules may be modified and or added at step 192. At step 194, the set of sample information may be analyzed again, based on the modified and/or new linguistic rules, to extract information associated with the relevant parameter, such as described above with reference to step 186.

At step 196, the results of the analysis performed at step 194 are analyzed. In some embodiments, such analysis includes determining the accuracy and thoroughness of the information extracted using the modified and/or new linguistic rules, such as described above with respect to step 188. In addition, in a particular embodiment, the information extracted at step 194 (based on the modified and/or new linguistic rules) is compared with the information extracted at step 186 (based on the original linguistic rules) to determine the effect of the modifications and/or additions to the linguistic rules performed at step 192. Such comparison may be performed to determine whether any information extracted at step 186 and determined at step 188 to be properly identified information (in other words, automatically extracted information determined to match manually identified baseline information) was not extracted at step 194 using the modified and/or new linguistic rules.

The method may then return to step 190 to determine whether to further adjust or add one or more of linguistic rules based on the results of the analysis performed at step 196. Steps 190 through 196 may be repeated until it is determined that the linguistic rules are sufficiently accurate and/or thorough.

It should be understood that in particular embodiments, contracts management component 30 may include various software embodied in computer-readable media and operable to perform all or portions of the functions and/or methods described above with respect to FIGS. 2-5. Such software may be concentrated in a particular software package or distributed in any number of software modules, programs, routines, or other collections of code, which may or may not be geographically distributed.

Figure 6:
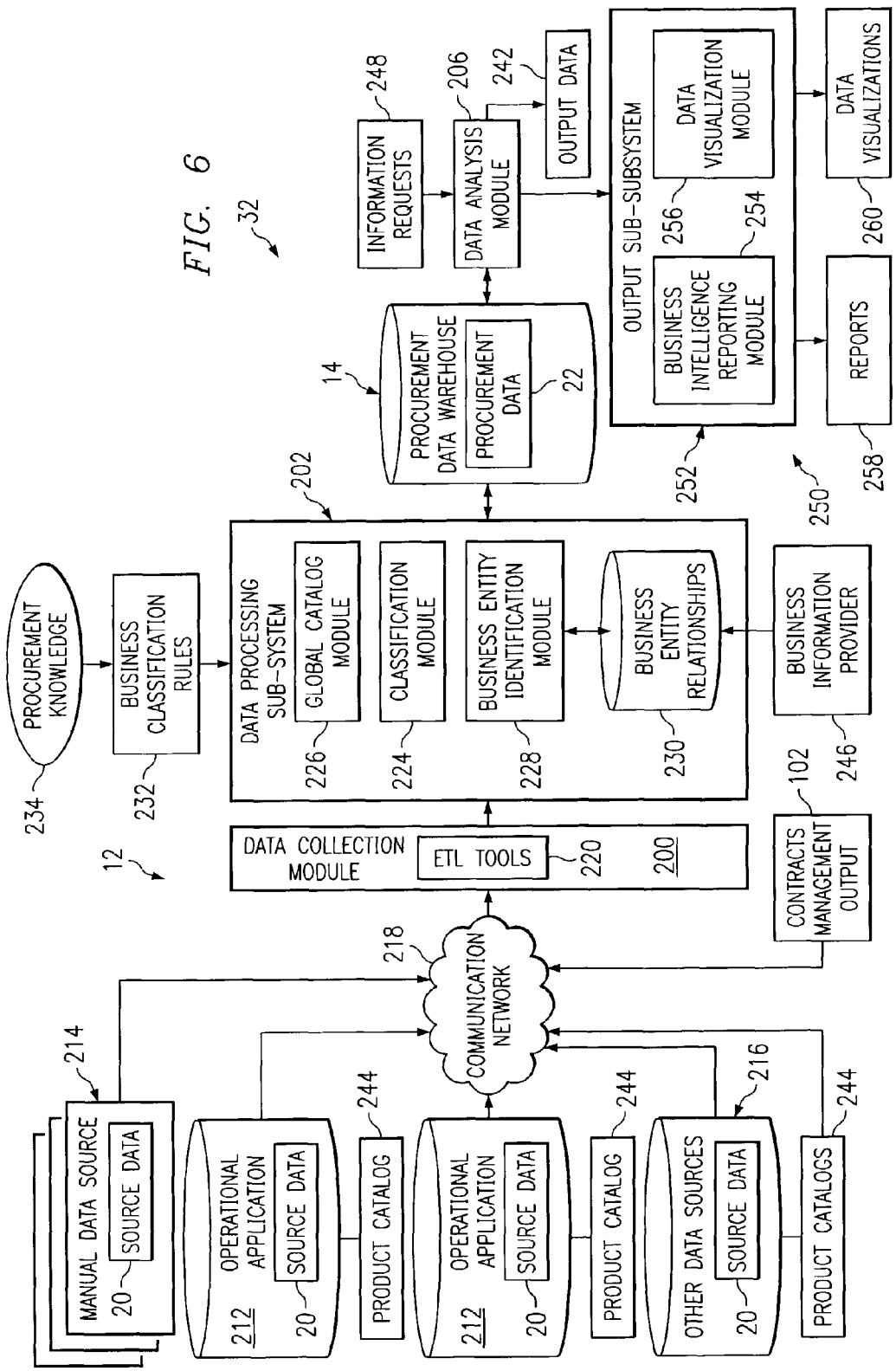
FIG. 6 illustrates an example architecture and operation of a spend management component of the procurement data management system of FIG. 1.

FIG. 6 illustrates an example architecture and operation of spend management component 32 in accordance with an embodiment of the present invention. In the embodiment shown in FIG. 6, spend management component 32 includes a data collection module 200, a data processing subsystem 202, procurement data warehouse 14, a data analysis module 206, a data visualization module 208, and a business intelligence reporting module 210.

Data collection module 200 may be operable to receive or extract source data 20 regarding historical procurement events from a variety of purchasing data sources 12 via a communications network 218. Data sources 12 may include a variety of heterogeneous data sources, such as operational applications 212, manual source data applications 214 (such as spreadsheet files, for example) and/or other data sources 216 suitable to communicate information regarding procurement events. In some embodiments, particular operational applications 212 may include an on-line transaction processing (OLTP) system, a teleprocessing monitor, a data management system (such as a DB2, ORACLE, or SYBASE system, for example), and/or may have capabilities including on-line data entry and batch processing, for example.

One or more data sources 12 may be co-located or geographically distributed. In addition, as shown in FIG. 6, data sources 12 may be coupled to data collection module 200 via communications network 218. Communications network 218 may, in particular embodiments, include one or more local area networks (LANs), metropolitan area networks (MANs), wide area networks (WANs), portions of the Internet, or any other appropriate wireline, optical, wireless, or other links. It should be understood in particular embodiments, any or all of the various components of procurement data management system 10 (such as components, sub-systems, databases, and modules, for example) may be connected to each other by communications network 218 or any suitable communications network.

As discussed above with reference to FIG. 1, source data 20 may include information from purchase orders (such as information regarding suppliers, products, prices, refunds, rebates, margins, and dates, for example), general ledger account information (such as general ledger account codes, for example), a listing of procured products and services, where such procurements are made, who is responsible for making such procurements, payment information, and a variety of other information regarding historical procurement events.

Data collection module 200 may also be operable to receive contracts management output 102 generated from contracts management component 30. As discussed above, contracts management output 102 may include processed and/or unprocessed extracted information 74 automatically extracted from various electronic contracts 60 (for reference, see FIG. 2). In this manner, spend management component 32 may use particular output of contracts management component 30 as an input used in generating the output of spend management component 32.

Each purchasing data source 12 may have one or more associated product catalogs 244, each product catalog 244 identifying each of a set of products by one or more source-specific attributes, such as model and part number, for example. Thus, a particular product may be referenced by different purchasing data sources 12 (or even within a particular purchasing data source 12) using different attributes (such as different part numbers), depending on the particular source-specific catalogs 244 used by the various purchasing data sources 12 to identify the product.

Data collection module 200 may include one or more processing elements operable to process source data 20 received or extracted from various purchasing data sources 12. In the embodiment shown in FIG. 6, data collection module 200 includes extraction, transformation and loading (ETL) tools 220. ETL tools 220 may be operable to enable the collection of source data 20 from many purchasing data sources 12 efficiently. In general, ETL tools 220 may include extraction tools, transformation tools, and loading tools for the extraction, transformation and loading of source data 20. The extraction tools of ETL tools 220 may be operable to identify purchasing data sources 12, identify source data 20 to be extracted, schedule the extraction of source data 20, and facilitate the transportation of the source data 20 to be extracted.

The transformation tools of ETL tools 220 may be operable to perform integration, integration processing data conversion, data mapping, data cleansing, data quality processing, and/or data aggregation processing of various source data 20. Integration may involve eliminating inconsistencies in data received from multiple sources, converting data into a consistent, standardized format, and sorting and merging transformed data into a single data set for loading into procurement data warehouse 14. Integration processing may include adding time elements and new keys, converting common data elements into a consistent form, translating dissimilar codes into a standard code, converting physical data types into formats, and/or sorting data into a new sequence. Data conversion may include converting data representations (such as converting data from EBCDIC to ASCII, for example), converting operating systems (such as from UNIX to WINDOWS NT), and/or converting the data type. Data mapping may include mapping data elements from source tables and files to destinations fact and dimension tables, adding fields for unique keys and time elements, and/or using default values in the absences of source data. Data cleansing may include converting data from different sources into a single consistent data set operable to be analyzed, adhering to a particular standard for establishing codes, domains, formats, and naming conventions, and correcting data errors and filling the missing data values. Data quality processing may include selecting data from the best of multiple sources by using a selection criteria to qualify a source application to ensure that only acceptable data is forwarded to procurement data warehouse 14. Data aggregations includes generating summarized data for use in aggregate and dimension tables. Thus, in particular embodiments, the transformation tools are operable to generate metadata (in other words, "data about data") regarding source data 20 received or extracted from various purchasing data sources 12.

The loading tools of ETL tools 220 may be operable to load extracted source data 20 into data processing subsystem 202. In particular embodiments, the loading tools may utilize structured query language (SQL) for loading source data 20. In particular embodiments, ETL tools 220 may be provided in a commercially available package, such as "POWER MART" provided by INFORMATICA, "DATA MART BUILDER" provided by ORACLE, "NOMAD" provided by AONIX, or "SAS DATA WAREHOUSE" provided by SAS INSTITUTE, for example.

Data processing subsystem 202 may be operable to process source data 20 collected or extracted by data collection module 200 before or after such source data 20 is loaded into procurement data warehouse 14 as procurement data 22. In the embodiment shown in FIG. 6, data processing subsystem 202 includes a classification module 224, a global catalog module 226, a business entity identification module 228, and a business entity relationships database 230.

Classification module 224 may be operable to categorize and/or subcategorize each procurement event based on one or more business rules 232. In particular embodiments, classification model 224 is operable to provide a global procurement classification system and to classify all procurement events according to the global classification system regardless of the classification systems used by each data source 214 and/or 216. Business classification rules 232 may be based on the product or service purchased, the business purpose of the transaction, the financial nature of the transaction, or any other attribute associated with a transaction. In a particular embodiment, business classification rules 232 are developed based on a variety of procurement knowledge 234, such as knowledge available to particular system experts or business analysts regarding a particular business's needs, desires, or future plans, for example.

Global catalog module 226 may be operable to store a global product catalog specifying, for each of a global set of products, one or more generic attribute fields as well as mapping relationships between the one or more generic attribute fields and various source-specific product attributes specified by one or more source-specific product catalogs 244. For example, for a particular product, the global catalog may specify a generic part number as well as mapping relationships between the generic part number and various part numbers specified for that particular part by various source-specific product catalogs 244.

Global catalog module 226 may be operable to utilize the global product catalog to map the various source-specific attributes associated with particular products to the generic attributes specified by the global product catalog for those products. Thus, in particular embodiments, global catalog module 226 may be essentially operable to merge any number of source-specific product catalogs 244 to provide consistent identification of products and services. In addition, the global product catalog may provide a comprehensive list of all products and services procured by a particular business entity.

Business entity identification module 228 may be operable to identify and track the business entity or entities specified by each procurement event as well as one or more business entities having a particular relation to such business entity or entities specified by each procurement event. For example, business entity identification module 228 may be operable to identify a particular supplier specified by a procurement event as well as the corporate parent and/or subsidiaries of the particular supplier specified by the procurement event. Business entity relationships database 230 may be operable to store various business relationships among sets of two or more related business entities, such as business entities having some type of ownership relationship, for example.

Thus, for example, business entity relationships database 230 may store business relationships between a parent corporation and a subsidiary of the parent corporation. Business entity identification module 228 may be operable to identify a procurement event specified by procurement data 22 relating to the subsidiary corporation (such as information regarding a purchase made by the subsidiary). Business entity identification module 228 may then identify, based on business relationships stored in database 230, the parent corporation of the subsidiary, and associate the parent corporation with the procurement event. If a user then requests information concerning the procurement event, or the spending behavior of the subsidiary, spend management component 32 may be operable to provide such information to the user (such as by generating a data visualization or report, for example) regarding both the subsidiary and the parent corporations.

One or more business relationships stored in business entity relationships database 230 may be received from a business information provider 246. For example, in particular embodiments, business relationships may be received automatically by one or more on-line business information providers, such as DUN & BRADSTREET, for example. Business entity identification module 228 may be operable to utilize business entity relationships database 230 to help identify business entities that are directly and/or indirectly related to particular procurement events. As discussed below in greater detail, identifying the business entities directly and/or indirectly related to particular procurement events may allow a user to obtain a report or data visualization illustrating particular procurement information regarding two or more related business entities, such as a parent corporation and its subsidiaries, for example.

Procurement data warehouse 14 may be operable to receive data from data processing subsystem 202 as procurement data 22. In particular embodiments, new procurement data 22 may be added to procurement data warehouse 14 and/or some or all of the procurement data 22 currently stored in procurement data warehouse 14 may be modified, replaced and/or deleted periodically. For example, in a particular embodiment, procurement data 22 may be automatically updated each time source data 20 associated with one or more purchasing data sources 12 is updated, after such updated source data 20 is extracted by data collection module 200 and processed by data processing subsystem 202. Thus, in some embodiments, procurement data warehouse 14 may provide a comprehensive, real-time collection of all procurement data associated with a variety of purchasing data sources 12.

Data analysis module 206 may be operable to analyze particular procurement data 22 stored in procurement data warehouse 14 in order to generate various output 250 that may be used by a user, such as a spending decision-maker, to make effective spending decisions. Such output may include results of an analyses regarding various procurement issues, such as spending associated with a particular procurement process, for example. In particular embodiments, for example, data analysis module 206 may perform an analysis and generate an associated output regarding a particular procurement process, the procurement of particular products or services, purchases made by particular business entities (or particular divisions thereof) and purchases made from particular suppliers, for example, such as how much is being spent on particular products or services, how much is being spent by particular business entities (or particular divisions thereof), in which geographic areas is the spending occurring, from which suppliers are particular products or services being purchased, and who is making and/or authorizing particular spending decisions, for example.

In particular embodiments, data analysis module 206 may be operable to perform both focused spending analyses (such as evaluating spending by particular divisions or units of a business entity, spending on particular products or services, or spending from a particular supplier, for example) as well as global, or broad, spending analyses (such as evaluating spending by the overall business entity, spending on all products and services, or spending from all suppliers, for example).

In addition, data analysis module 206 may be operable to perform a variety of analyses periodically in order to track performance in particular business areas. For example, data analysis module 206 may be operable to periodically (such as each time procurement data 22 or extracted information 74 is updated, for example) compare portions of procurement data 22 with portions of extracted information 74 to automatically track performance regarding a particular business opportunity. For example, each time new procurement data 22 is added to procurement data warehouse 14, data analysis module 206 may be operable to analyze the current total spending on a particular product to determine whether a particular rebate opportunity (as specified by a supplier contract, for example) is available, or how much additional spending would trigger such a rebate opportunity. In addition, data analysis module 206 may be operable to generate a notification regarding the results of such periodic analyses and communicating such notifications to particular business entities or individuals associated with such business entities, such as individuals responsible for making procurement decisions, for example.

In addition to the various forms of output generated by output sub-system 252, data analysis module 206 may also be operable to generate output data 242 to be imported into procurement data warehouse 14 and/or used by other components of procurement data management system 10. For example, as shown in FIG. 2, procurement data warehouse 14 is associated with, or utilized by, compliance management component 34 and supplier intelligence component 36 of system 10. Thus, in particular embodiments, as discussed below regarding FIGS. 10 and 13, data analysis module 206 may be operable to generate output data 242 which may be used as an input by compliance management component 34 and/or supplier intelligence component 36 of system 10.

In some embodiments, data analysis module 206 may also be operable to determine the effect or influence of particular procurement activities or decisions on various other procurement activities or decisions. For example, data analysis module 206 may be operable to determine the financial effect of purchases made by one division of a business entity on another division of the business entity.

Data analysis module 206 may be operable to identify business opportunities associated with a procurement process, such as opportunities to reduce spending, or increase rebates, discounts or refunds, for example. In particular embodiments, data analysis module 206 may be operable to compare, contrast, or otherwise analyze particular procurement data 22 to determine whether a business opportunity is available. For example, data analysis module 206 may be operable to compare particular procurement data 22 (such as particular contracts management output 102, for example) regarding rebate opportunities from a particular supplier with particular procurement data 22 regarding purchases made form that supplier in order to discover potential or existing rebate opportunities, such as described above with reference to contracts application 90 of contracts management component 30. In addition, data analysis module 206 may also be operable to generating a notification if it is determined that the business opportunity is available, and to communicate the opportunity notification to appropriate individuals (such as procurement managers, for example) or business entities. In particular embodiments, the various types of analyses that may be performed by data analysis module 206 may be more effective, accurate, faster and/or less expensive than traditional methods used to attempt such complex analyses.

In analyzing procurement data 22, data analysis module 206 may be operable to identify information regarding particular products or services based on the generic attributes associated with, or mapped to, the products according to global catalog module 226, as discussed above. For example, data analysis module 206 may be operable to identify all procurement data 22 related to a particular product using the generic attributes associated with, or mapped to, that product by global catalog module 226.

In addition, data analysis module 206 may be operable to perform various analyses and generate various outputs 250 based on information requests 248 made by users, such as system administrators or spending decision-makers, for example. For example, a user may communicate an information requests 248 to data analysis module 206 requesting a summary of spending on hardware by each division in a business entity from each of a number of suppliers. Data analysis module 206 may be operable to receive the request 248, analyze procurement data 22 relevant to the request, generate a visual output, such as a three-dimensional graph or a report illustrating the requested spending summary, and communicate the visual output to the requesting user.

Data analysis module 206 may include a variety of analytical tools operable to perform a variety of data analysis, such as the types of analysis described above, for example. For example, in the embodiment shown in FIG. 7, data analysis module 206 includes one or more optimization tools 270, one or more simulation tools 272, forecasting and trends analysis tools 274, and one or more statistical tools 276. Optimization tools 270 may be operable to optimize a particular parameter based on a variety of inputs. For example, optimization tools 270 may be operable to determine how to optimize the total cost associated with a procurement process based on a variety of different spending decisions, such as which products and/or services to purchase from which suppliers, for example.

Simulation tools 272 may be operable to perform various simulations (such as "what if" analyses and alternative-decisions analyses, for example) based on a set of assumed procurement decisions. For example, simulation tools 272 may be operable to select a set of hypothetical procurement decisions regarding a procurement process or event, and analyzing the financial effects of such hypothetical procurement decisions. Simulation tools 272 may also be operable to determine the total cost associated with the procurement process or event based on the set of hypothetical procurement decisions, which may be then used by optimization tools 270 and/or forecasting and trends analysis tools 274.

Forecasting and trends analysis tools 274 may be operable to analyze particular trends in procurement data 22, such as trends regarding spending decisions, and to make forecasts based on such trends. For example, forecasting and trends analysis tools 274 may be operable to forecast spending on particular products or services from particular suppliers based on historical procurement data. Forecasting and trends analysis tools 274 may cooperate with optimization tools 270, simulation tools 272 and/or statistical tools 276 in order to generate forecasts.

Statistical tools 276 may provide statistical analysis of procurement data, which may be used by optimization tools 270, simulation tools 272 and/or forecasting and trends analysis tools 274. In a particular embodiment, statistical tools 276 include tools operable to identify aggressions 282, trends 284, forecasts 286, and clustering of data 288.

Data analysis module 206 may include separate entities or software modules or may be a collected set of modules, such as modules or functionalities provided by a particular software package, for example. In a particular embodiment, data analysis module 206 may include business intelligence software provided by MICROSTRATEGY, INC.

Referring again to FIG. 6, output subsystem 252 may be operable to generate human-readable output 250 illustrating the results of various analyses generated by data analysis module 206. For example, output subsystem 252 may be operable to generate human-readable output illustrating a summary of spending on hardware by each division in a business entity from each of a number of suppliers.

In the embodiment shown in FIG. 6, output subsystem 252 includes a data visualization module 256 and a business intelligence reporting module 254. Data visualization module 256 may be the same as or similar to data visualization module 94 discussed above with respect to contracts management component 30 shown in FIG. 2. For example, data visualization module 256 may be operable to generate a variety of data visualizations 260, such as advanced graphics, charting and three-dimensional images, for example, that may help users (such as business analysts or procurement decision-makers, for example) identify key factors affecting spending. In particular embodiments, data visualization module 256 may also provide various tools allowing the user to manipulate and navigate through the various data visualizations 260, such as described above regarding output subsystem 92 shown in FIG. 2.

Business intelligence reporting module 254 may be the same as or similar to business intelligence reporting module 98. Business intelligence reporting module 254 may be operable to generate a variety of business intelligence reports 258 regarding compliance and/or non-compliance impacts determined by data analysis module 206. In a particular embodiment, data visualizations module 256 may comprise the software package MINDSET provided by SILICON GRAPHICS, INC., and business intelligence reporting module 254 may comprise a business intelligence software package provided by MICROSTRATEGY, INC.

FIG. 8 illustrates an example method of managing procurement spending in accordance with an embodiment of the present of the invention. At step 262, various source data regarding historical procurement events may be extracted or collected from a variety of data sources. The data sources may be heterogeneous, and may include operational applications, manual source data applications (such as spreadsheet files, for example), as well as information automatically extracted from a set of electronic contracts (such as extracted information 74 discussed above with reference to FIG. 2). In particular embodiments, one or more of the data sources may have an associated source-specific product catalog, each identifying a set of products by one or more source-specific attributes, such as part number for example. The source data may be collected using one or more data collection tools, such as a set of extraction, transformation and loading (ETL) tools.

At step 264, a set of business classification rules operable to categorize and/or sub-categorize particular procurement events may be generated and/or stored. The set of business rules may be developed based on the procurement knowledge of one or more business rules experts, for example.

At step 266, a global product catalog may be generated and/or stored. In particular embodiments, the global product catalog may specify generic attribute fields for each of a global set of products, as well as mapping relationships between the generic attribute fields and various source-specific product attributes specified by the source-specific product catalogs discussed above.

At step 268, a set of business entity relationships may be identified, stored and/or tracked. Such business entity relationships may include ownership or other defined business relationships, such as a parent-subsidiary or joint venture relationship, for example. In particular embodiments, some or all of the business entity relationships may be automatically received from a business information provider, such as DUN & BRADSTREET, for example. At step 270, the source data collected at step 262 may be processed according to various business classification rules, product attribute mapping relationships, and/or business entity relationships generated and/or stored at steps 264, 266 and 268. For example, the source data may be classified by the set of business classification rules regardless of various classification systems used by the various data sources. In addition, the source-specific attributes associated with particular products specified by the source data may be mapped to the generic attributes specified by the global product catalog in order to provide consistent identification of products and/or services. In addition, business entities directly and/or indirectly related to particular source data may be identified based on the business entity relationships. For example, procurement data regarding a particular supplier may be organized together and linked to procurement data regarding various other suppliers or other business entities determined to be related to the particular supplier based on the business entity relationships.

At step 272, the source data processed at step 270 may be stored as procurement data in a procurement data warehouse.

At step 274, at least a portion of the procurement data may be analyzed to generate a variety of outputs regarding procurement spending. In particular embodiments, such outputs may include one or more data visualizations and/or business intelligence reports which may be used by a user, such as a spending decision-maker, to make effective spending decisions. In a particular embodiment, a user may identify, based on an analysis of a particular data visualization, a particular factor or parameter of interest, and generate an information request for additional information regarding the factor or parameter of interest. Information regarding the factor or parameter of interest may be collected from the procurement data warehouse and included in an business intelligence report communicated to the requesting user.

In particular embodiments, the various output generated at step 274 may also include analysis results operable to be used by one or more other components of procurement data management system 10, such as compliant management component 34 and/or supplier intelligence component 36. In this manner, various output of spend management component 32 may be used as input by one or more other components of system 10.

At step 276, the procurement data stored in the procurement data warehouse may be periodically modified and/or new procurement data may be periodically added. For example, in particular embodiments, the procurement data may be modified based on a modification or addition to the collected source data, one or more of the business classification rules, the global product catalog, or the business entity relationships. In particular embodiments, the procurement data stored in the procurement data warehouse may be modified automatically and in real time. The method may then return to step 274 to analyze the new and/or modified procurement data. In this manner, spending analyses may be performed periodically and in real time based on the procurement data currently stored in the procurement data warehouse.

It should be understood that in particular embodiments, spend management component 32 may include various software embodied in computer-readable media and operable to perform all or portions of the functions and/or methods described above with respect to FIGS. 6-8. Such software may be concentrated in a particular software package or distributed in any number of software modules, programs, routines, or other collections of code, which may or may not be geographically distributed.

Figure 9A:
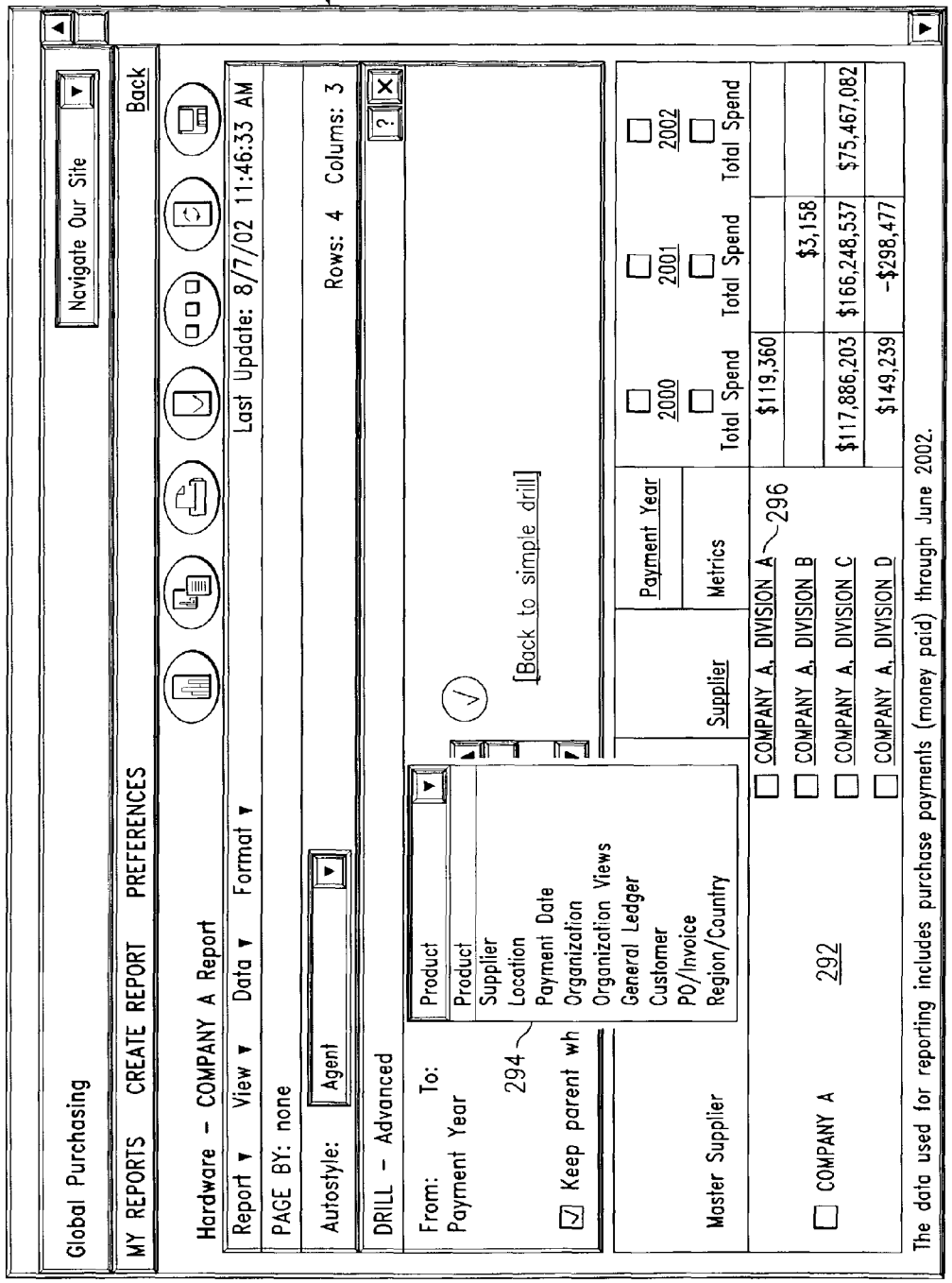
FIG. 9A illustrates a display of an example output generated by the spend management component of FIG. 6.

FIG. 9A illustrates a display 290 of an example output 250 generated by data analysis module 206 and/or output subsystem 252 of spend management component 32 in accordance with an embodiment of the present invention. Display 290 illustrates a variety of information regarding patterns and behavior of spending on products and/or services from a particular supplier, Company A. For example, display 104 includes a spending summary section 292 operable to display the results of a spending analysis performed by data analysis module 206. Spending summary section 292 may indicate particular spending behaviors broken down by any of a variety of parameters. For example, as shown in FIG. 9A, spending summary section 292 indicates annual spending by a particular business entity, broken down by master supplier (Company A) and further by each supplier associated with the master supplier or by divisions (Divisions A, B, C and D) of the master supplier.

Like display 104, display 290 may be displayed by an interactive user interface, such as in a WINDOWS environment, for example, such that a user may navigate through the display and select particular details for further analysis. In particular embodiments, display 290 is presented by an Internet browser and includes various icons, pull-down menus and/or hypertext items (which may include underlined and/or colored text, for example) that may be selected by a user to retrieve additional information regarding particular items.

For example, as shown in FIG. 9A, a user may select any of a variety of parameters from a pull-down menu 294 to retrieve a display of information relevant to the selected parameter. Thus, a user may select "Location" from pull-down menu 294 to retrieve a display of particular spending information broken down by geographic location. As another example, a user may select the hypertext item 296 labeled "Company A, Division A" to retrieve a more detailed display of purchases made from Division A of Company A.

Figure 9B:
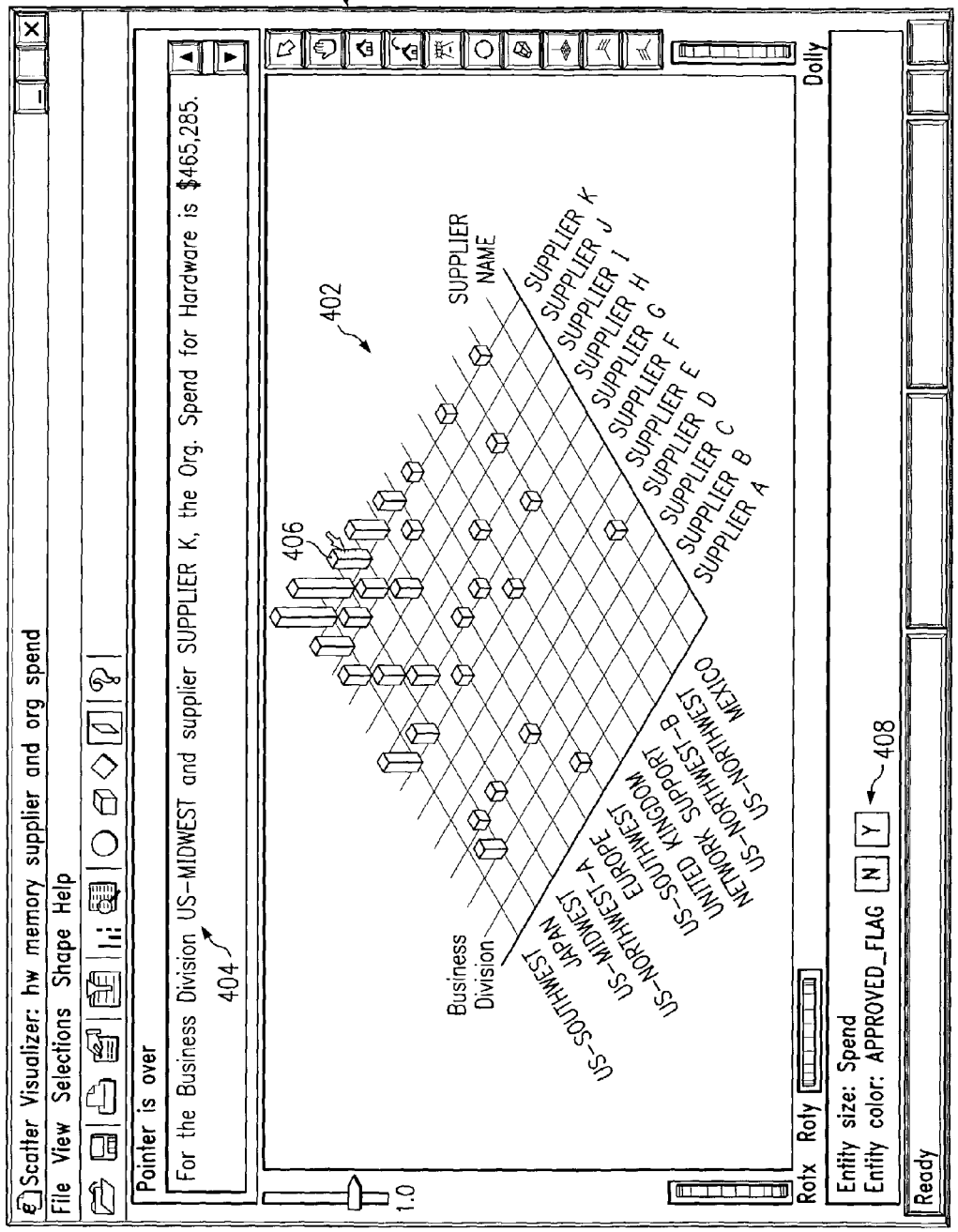
FIG. 9B illustrates an example data visualization generated by the spend management component of FIG. 6.

FIG. 9B illustrates an example data visualization 400 generated by output subsystem 252 of spend management component 32 in accordance with an embodiment of the present invention. In general, data visualization 400 illustrates amounts spent on hardware products from each of a number of suppliers by each of a number of organizational divisions, or levels, of a purchasing organization.

Data visualization 400 includes a three-dimensional graphic 402 and a data point detail 404. Three-dimensional graphic 402 comprises a scatter chart having a number of business divisions (US-Southwest, Japan, etc.) along a first axis, a number of suppliers (Supplier A, Supplier B, etc.) along a second axis, and a number of data bars extending along a third axis at various intersections of business divisions and suppliers. The height of a data bar located at the intersection of a particular business divisions and a particular supplier is proportional to the amount spent by the particular business divisions on products and/or services from the particular supplier. For example, the height of data bar 406 is proportional to the amount spent by the US-Midwest division of the purchasing organization on products and/or services from Supplier K.

Graphic 402 may also indicate whether particular expenditures are approved or non-approved, or compliant or non-compliant. For example, all data bars related to non-approved or non-compliant expenditures may be shaded or colored differently than approved or compliant expenditures, which may be indicated by a key or legend 408. Thus, a user may imply from graphic 402 shown in FIG. 9B that all procurements made from Suppler F are non-approved procurements.

In a particular embodiment, data point detail 404 may display various information, such as a numerical quantity, associated with a particular selected data bar. For example, as shown in FIG. 9B, if a user positions a cursor or pointer over data bar 406, data point detail 404 may display information regarding data bar 406, such as the name of the business divisions and supplier corresponding with data bar 406, and the numerical amount of money represented by data bar 406.

Like display 104, data visualization 400 may be displayed by an interactive user interface, such as in a WINDOWS environment, for example, such that a user may navigate through the display and select particular details for further analysis. In particular embodiments, data visualization 400 is presented by an Internet browser and includes various icons, pull-down menus and/or hypertext items (which may include underlined and/or colored text, for example) that may be selected by a user to retrieve additional information regarding particular items.

Figure 10:
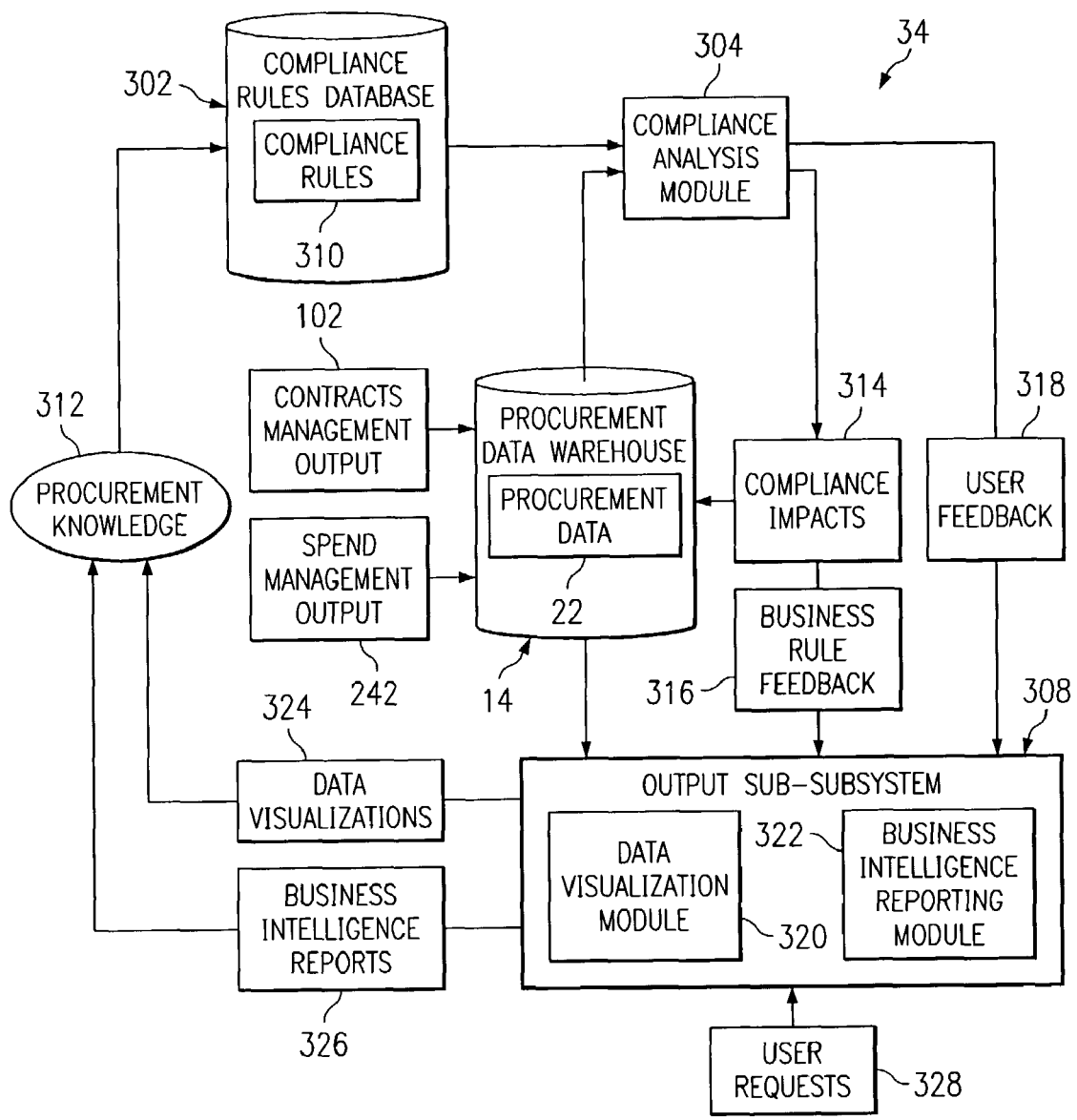
FIG. 10 illustrates an example architecture and operation of a compliance management component of the procurement data management system of FIG. 1.

FIG. 10 illustrates an example architecture and operation of compliance management component 34 of system 10 in accordance with an embodiment of the present invention. Compliance management component 34 is generally operable to monitor compliance with a set of strategic business rules regarding the procurement of particular products and services. In particular embodiments, compliance management component 34 is operable to access large amounts of heterogeneous data from multiple sources to identify the who, what, where, when and why of non-compliance, quantify the impact of such non-compliance, and communicate such information to business decision-makers who may have the knowledge and/or authority to correct the non-compliance. In addition, compliance management component 34 may be operable to monitor the effectiveness of the business rules themselves and to modify such business rules in response to changes in the business climate and supplier community in order to maximize business opportunities.

In a particular embodiment, compliance management component 34 may include procurement data warehouse 14 including various procurement data 22, a compliance analysis module 304, a compliance impacts model 306 and an output sub-system 308. As discussed above with reference to FIG. 6, procurement data warehouse 14 may include a variety of procurement data 22, which may include source data 20 received from one or more purchasing data sources 12.

Procurement data warehouse 14 may also be operable to receive contracts management output 102 generated by contracts management component 30. As discussed above, contracts management output 102 may include information 74 automatically extracted from various electronic contracts 60 (see FIG. 2 for reference). In this manner, compliance management component 34 may use particular output of contracts management component 30 as an input for performing analyses and/or generating outputs associated with compliance management component 34.

In addition, procurement data warehouse 14 may be operable to receive spend management output 242 generated by spend management component 32. As discussed above, spend management output 242 may include results of procurement or spending analyses performed by data analysis module 206 of spend management component 32. In this manner, compliance management component 34 may use particular output of spend management component 32 as an input for performing analyses and/or generating outputs associated with compliance management component 34.

Compliance rules database 302 is operable to store a set of compliance rules, or business compliance rules, 310 that specify specific attributes and values of procurement events that must be achieved in order for a particular procurement event to be considered compliant. In particular embodiments, compliance rules 310 also specify how to calculate the financial impact of non-compliance with particular compliance rules 310.

Compliance rules 310 may be developed or written by business rules experts and/or subject matter experts based on a set of procurement knowledge 312 available to such business rules experts and/or subject matter experts. Procurement knowledge 312 may include a set of requirements regarding which suppliers to buy goods or services from based on a number of various factors, forecasted conditions, current and historical performance measurements, subject matter expert (SME) intelligence about businesses or industries, and current economic conditions, for example. In a particular embodiment, business rules experts and/or subject matter experts may use such procurement knowledge 312 to develop compliance rules 310 operable to determine whether a purchaser is buying goods or services from approved or non-approved suppliers.

Compliance analysis module 304 may be operable to automatically analyze procurement data 22 regarding one or more particular procurement events to determine whether the one or more procurement events are compliant or non-compliant according to one or more compliance rules 310. For example, compliance analysis module 304 may be operable to determine whether particular procurements were made from approved or non-approved suppliers based on one or more compliance rules 310. Compliance analysis module 304 may also be operable to determine the financial impact 314 of compliance and/or non-compliance with particular compliance rules 310. For example, for procurement events (such as particular purchases from a particular supplier, for example) determined to be non-compliant, compliance analysis module 304 may determine the financial impact 314 of such non-compliance based on one or more compliance rules 310.

The financial impact 314 of compliance or non-compliance of a particular procurement event, as determined by compliance analysis module 304, may be stored in procurement data warehouse 14 as an additional attribute associated with the particular procurement event. As shown in FIG. 10, compliance analysis module 304 may also be able to generate business rule feedback 316 and user feedback 318 based on an analysis of particular procurement data 22 according to one or more compliance rules 310. Business rule feedback 316 provides various feedback regarding the effectiveness of particular compliance rules 310. For example, business rule feedback 316 may include feedback regarding situations in which non-compliance procurement events actually provide a financial advantage, as well as feedback regarding particular procurement events that are not covered by the set of compliance rules 310. Business rule feedback 316 may allow a user or system administrator to easily monitor the effectiveness of particular compliance rules 310 and to adjust or fine tune them accordingly.

User feedback 318 may include reasons for non-compliance of a particular procurement event as well as recommendations regarding actions to be taken to correct the non-compliance situation. Thus, user feedback 318 may assist a user or a system administrator in understanding the nature of a particular non-compliant procurement event. In particular embodiments, user feedback 318, including reasons for non-compliance as well as information necessary or helpful to correct the situation, may be communicated throughout an organization, or at least relevant parts of an organization. For example, in a particular embodiment, user feedback 318 may be communicated to all procurement decision-makers within an organization by an automatically-generated e-mail notification or report.

Compliance analysis module 304 may include a variety of analytical tools operable to perform various compliance analyses. For example, compliance analysis module 304 may include some or all of the analytical tools discussed above with reference to data analysis module 206 shown in FIGS. 6 and 7. Thus, in particular embodiments, compliance analysis module 304 may include one or more optimization tools, simulation tools, forecasting and trends analysis tools, and statistical tools.

Output subsystem 308 may be operable to generate output regarding the compliance and/or non-compliance of particular procurement events. In particular embodiments, output subsystem 308 may be operable to generate output in response to a user request 328 for particular compliance information. For example, output subsystem 308 may be operable to generate human-readable output indicating whether particular procurement events are compliant or non-compliant, the financial impact (both positive and negative) of such compliance or non-compliance, as well as particular business rule feedback 316 and user feedback 318 generated by compliance analysis module 304.

In the embodiment shown in FIG. 10, output subsystem 308 includes a data visualization module 320 and a business intelligence reporting module 322. Data visualization module 320 may be the same as or similar to data visualization module 94 discussed above with respect to contracts management component 30 shown in FIG. 2. For example, data visualization module 320 may be operable to generate a variety of data visualizations 324, such as advanced graphics, charting and three-dimensional images, for example, that may help users (such as business analysts or procurement decision-makers, for example) identify key factors affecting compliance and non-compliance. In particular embodiments, data visualization module 320 may also provide various tools allowing the user to manipulate and navigate through the various data visualizations 324, such as described above regarding output subsystem 92 shown in FIG. 2.

Business intelligence reporting module 322 may be the same as or similar to business intelligence reporting module

98. Business intelligence reporting module 322 may be operable to generate a variety of business intelligence reports 326 regarding compliance and/or non-compliance impacts determined by compliance analysis module 304.

Figure 11:
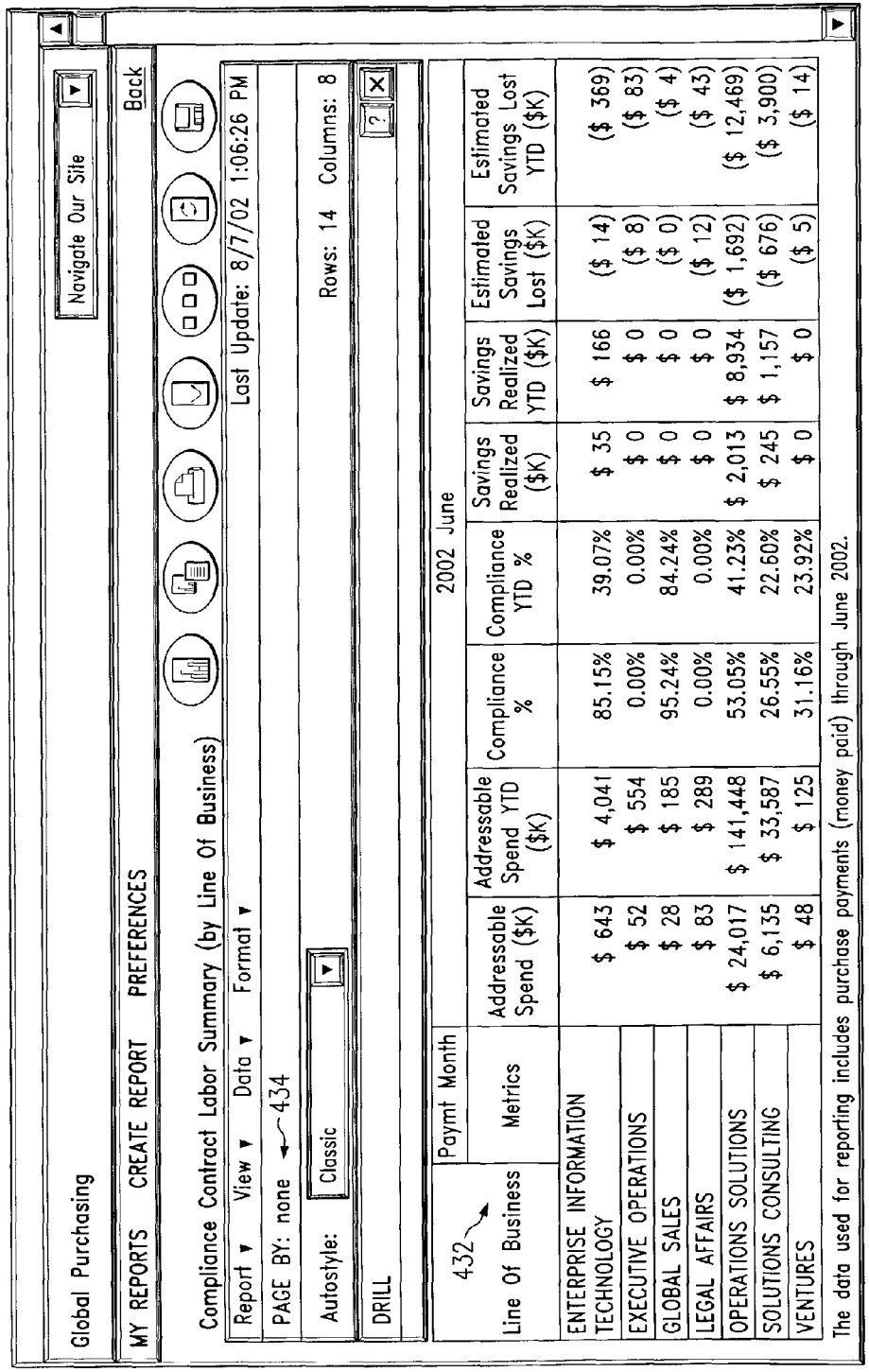
FIG. 11 illustrates a display of an example output generated by the compliance management component of FIG. 10.

FIG. 11 illustrates a display 430 of an example output generated by output subsystem 308 of compliance management component 34 in accordance with an embodiment of the present invention. Display 430 illustrates a variety of information regarding compliance and non-compliance with particular labor contracts. For example, display 430 includes a compliance analysis table 432 and a number of interactive tools 434.

As shown in FIG. 11, compliance analysis table 432 displays a summary of compliance information regarding an organization, broken down by line of business of the organization. For example, compliance analysis table 432 displays a summary of various compliance metrics (such as "Addressable Spend YTD ($K)," "Compliance % YTD," "Savings Realized YTD ($K)," and "Est. Savings Lost YTD ($K)") for each line of business of an organization. In a particular embodiment, information displayed under the heading "Addressable Spend YTD ($K)" may be determined by spend management component 32, and information provided under the heading "Compliance % YTD" may be determined based on contracts management output 102. Thus, compliance analysis table 432 may provide an example of the interrelations between the various components of procurement data management system 10.

Display 430 may be displayed by an interactive user interface, such as in a WINDOWS environment, for example, such that a user may navigate through the display and request additional analyses using interactive tools 434. In particular embodiments, display 430 is presented by an Internet browser and includes various icons, pull-down menus and/or hypertext items (which may include underlined and/or colored text, for example) that may be selected by a user to retrieve additional information regarding particular items.

Figure 12:
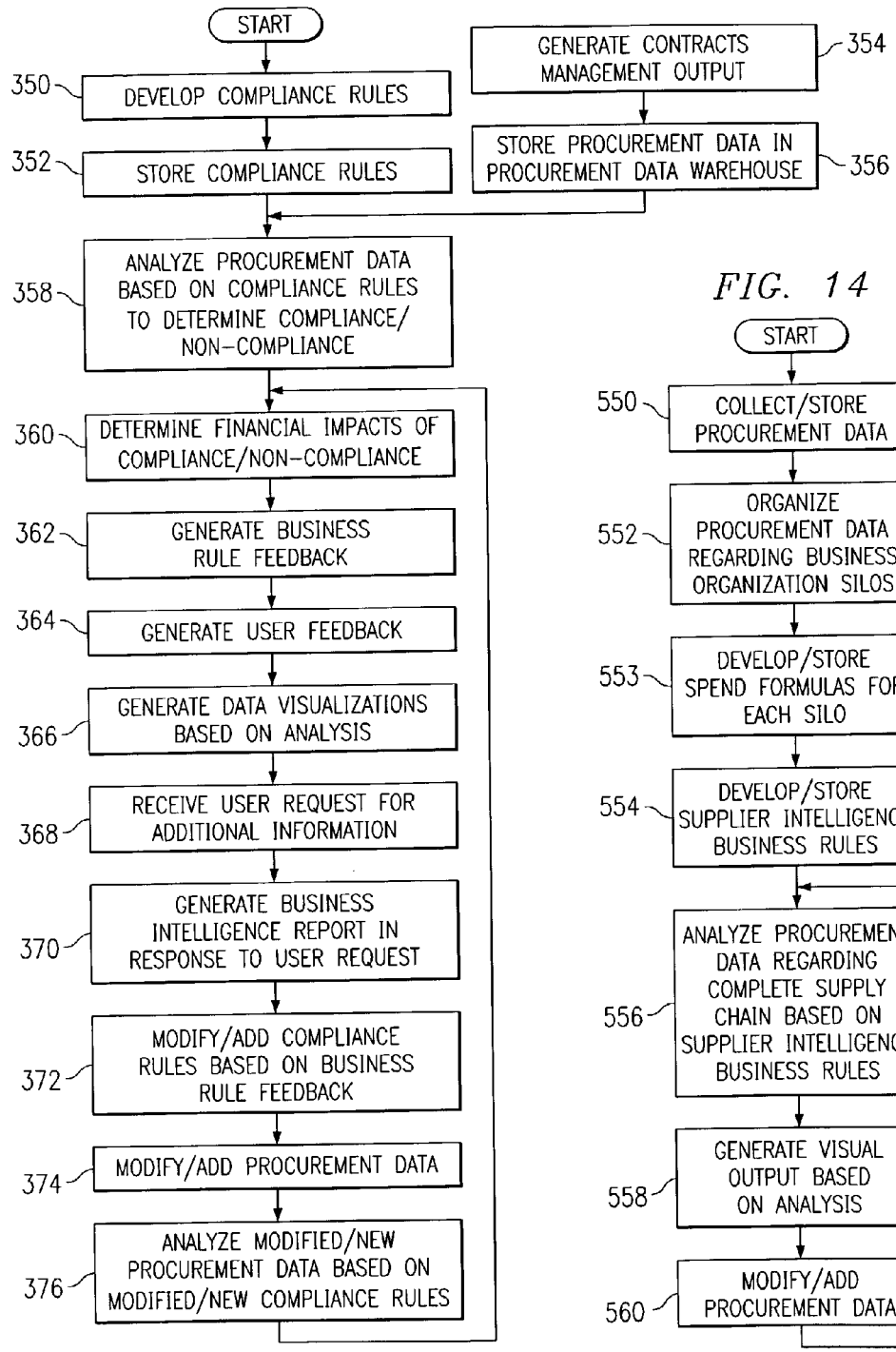
FIG. 12 illustrates an example method of managing compliance with business compliance rules in accordance with an embodiment of the present invention.

FIG. 12 illustrates an example method of managing compliance with business compliance rules in accordance with an embodiment of the present invention. At step 350, one or more compliance rules are developed or written based on a set of procurement knowledge, which may include knowledge regarding particular suppliers from which to purchase particular goods and services based on a variety of factors. At step 352, the compliance rules may be stored in a compliance rules database.

At step 354, contracts management output may be generated including, or at least based on, relevant information automatically extracted from a set of electronic contracts, such as extracted information 74 discussed above with respect to FIG. 2. At step 356, a variety of procurement data may be stored in a procurement data warehouse. In particular embodiments, the procurement data includes at least a portion of the contracts management outputs generated at step 354. The procurement data may include various information regarding any number or procurement events, such as purchase order information and invoice information, for example.

At step 358, procurement data regarding one or more particular procurement events may be analyzed to determine the compliance or non-compliance of one or more particular procurement events based on one or more of the compliance rules developed at step 350. At step 360, various financial impacts (both positive and negative) of the compliance and/or non-compliance of the particular procurement events may be determined. In a particular embodiment, such financial impacts are stored in the procurement data warehouse as an additional attribute associated with the particular procurement events.

At step 362, business rule feedback may be generated according to the analysis performed at step 358. Such business rule feedback may include feedback regarding situations in which non-compliance procurement events actually have a positive financial impact, as well as identifying procurement events that are not covered by the set of compliance rules developed at step 350. As discussed below with regard to step 372, the business rule feedback may allow an administrator or business rules expert to monitor the effectiveness of particular compliance rules and modify or add particular compliance rules accordingly. At step 364, user feedback may be generated based on the analysis performed at step 358. In particular embodiments, the user feedback indicates reasons for non-compliance of particular procurement events and provides recommendations for correcting such non-compliance situation.

At step 366, one or more data visualizations may be generated based on the results of the analysis performed at step 358. For example, such data visualizations may indicate whether their particular procurement events are compliant or non-compliant, the financial impacts determined at step 360 of such compliance and/or non-compliance, particular business rule feedback generated at step 362 and/or particular user feedback generated at step 364.

At step 368, a user, such as a business analyst, may identify, based on an analysis of particular data visualizations, a particular factor or parameter affecting compliance or non-compliance, and generate a user request for more information regarding that factor or parameter. At step 370, information regarding the identified factor or parameter may be collected from the procurement data warehouse and included in a business intelligence report communicated to the requesting user. In this manner, a user may identify an interesting aspect of a data visualization, request additional information regarding the identified aspect, and receive an automatically generated business intelligence report including the requested information.

At step 372, one or more of the compliance rules developed or written at step 350 may be modified based on particular business rule feedback generated at step 362. For example, a subject matter expert may receive a data visualization at step 368 indicating, based on business rule feedback generated at step 362, that a particular compliance rule is ineffective. The subject matter expert may then provide instructions or requirements to a system administrator or business rules expert for adjusting the ineffective compliance rule accordingly. As another example, a subject matter expert may receive a data visualization indicating, based on business rule feedback generated at step 362, that a particular procurement event is not covered by any of the compliance rules stored in the compliance rules database. The subject matter expert may then provide instructions or requirements to a system administrator or business rules expert for adding one or more new compliance rules to cover such procurement events in the future.

At step 374, the procurement data stored in the procurement data warehouse may be periodically modified and/or new procurement data may be periodically added. For example, in particular embodiments, the procurement data may be modified each time source data and/or contracts management output is added and/or modified, such as described above with reference to FIG. 6. At step 376, a new or updated analysis regarding the compliance or non-compliance of particular procurement events may be performed based on new or updated procurement data regarding such procurement events and/or based on new or updated compliance rules. In a particular embodiment, the new analysis regarding the compliance or non-compliance of particular procurement events is performed each time the procurement data or compliance rules related to such procurement events is modified.

After the addition or modification of the procurement data at step 374, the method may then return to step 360 to generate the various outputs associated with the compliance analysis performed at step 376. In this manner, compliance analyses may be performed periodically and in real time based on the procurement data currently stored in the procurement data warehouse.

It should be understood that in particular embodiments, compliance management component 34 may include various software embodied in computer-readable media and operable to perform all or portions of the functions and/or methods described above with respect to FIGS. 10-12. Such software may be concentrated in a particular software package or distributed in any number of software modules, programs, routines, or other collections of code, which may or may not be geographically distributed.

Figure 13:
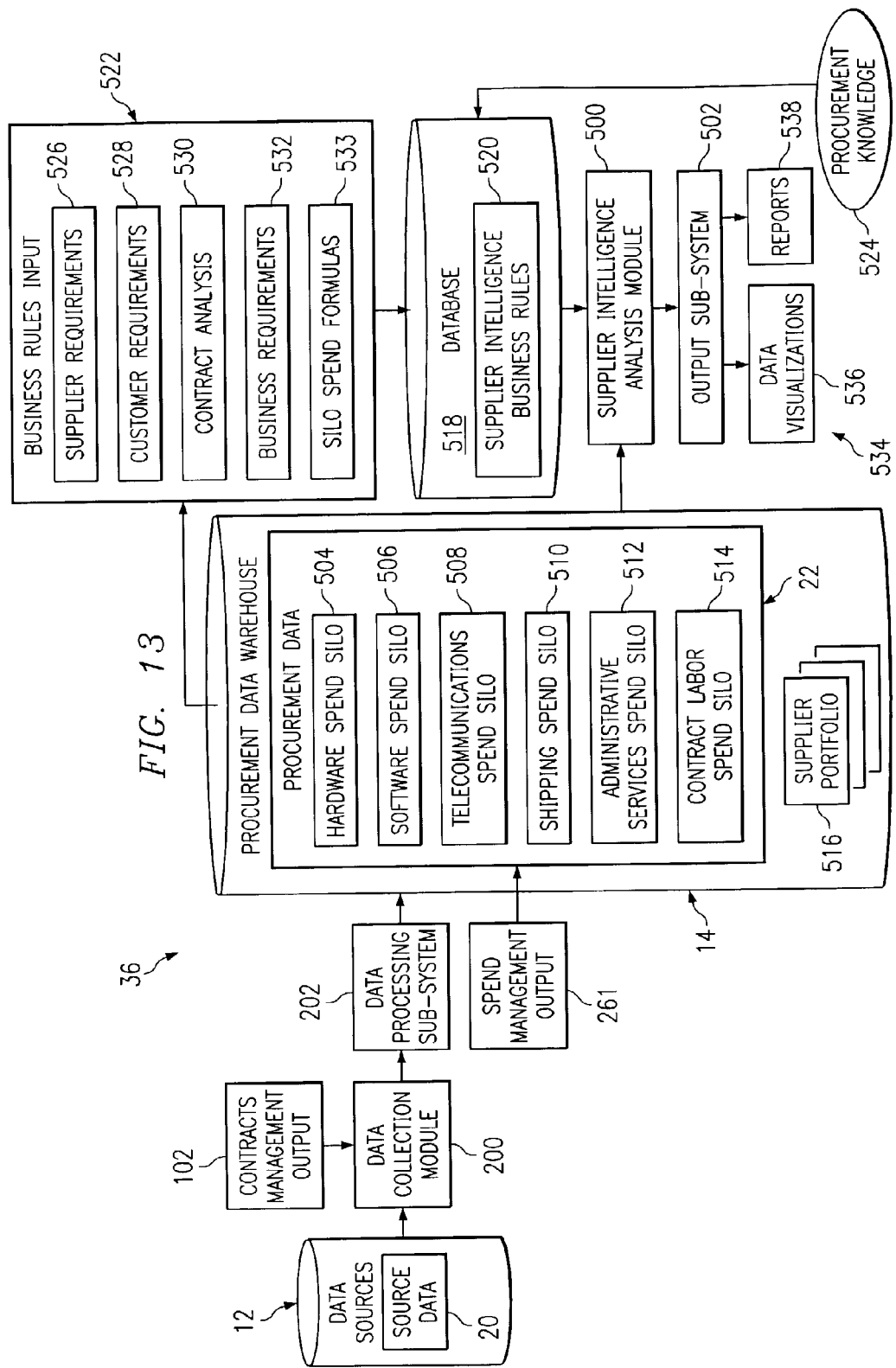
FIG. 13 illustrates an example architecture and operation of a supplier intelligence component of the procurement data management system of FIG. 1.

FIG. 13 illustrates an example architecture and operation of supplier intelligence component 36 of system 10 in accordance with an embodiment of the present invention. In general, supplier intelligence component 36 allows a user to manage a large volume of supplier management information, including information regarding multiple suppliers, contractual issues, international regulations, new products and services, particular business needs and human elements, for example, to assist the user in making supplier management decisions. In particular embodiments, supplier intelligence component 36 is operable to analyze a large volume of information, such as products, prices, multiple purchase orders, geography, inventory and shipping costs, for example, to optimize supplier management decisions in real time according to a set of heuristics and business rules. For example, supplier intelligence component 36 may be operable to analyze the effects that decisions made by particular spend categories or divisions of a business entity have on each other based on a total-cost-of-ownership view. In this matter, supplier intelligence component 36 may be operable to analyze a supply chain more effectively than previous or existing systems.

Supplier intelligence component 36 may include procurement data warehouse 14, a supplier intelligence analysis module 500, a supplier intelligence business rules database 518, and an output subsystem 502. As discussed above with reference to FIG. 6, procurement data warehouse 14 may include a variety of procurement data 22, including a variety of source data 20 from a number of data sources 12, as well as a set of contracts management output 102, which may include information automatically extracted from a set of electronic contracts, as discussed above with reference to FIG. 2. Source data 20 and contracts management output 102 may be collected and processed by data collection module 200 and data processing subsystem 202, as discussed above with reference to FIG. 6, and stored in procurement data warehouse 14 as procurement data 22.

Procurement data 22 may include spending information regarding a number of divisions, or silos, of a business organization. For example, as shown in FIG. 13, procurement data 22 may include spending data associated with a hardware spend silo 504, a software spend silo 506, a telecommunications spend silo 508, a shipping spend silo 510, an administrative services spend silo 512, and a contract labor spend silo 514. Within a particular procurement process, or supply chain, hardware spend silo 504 may be responsible for purchasing hardware, software spend silo 506 may be responsible for purchasing software, telecommunications spend silo 508 may be responsible for procuring and/or otherwise managing telecommunications, shipping spend silo 510 may be responsible for managing shipping of procured products, administrative services spend silo 512 may be responsible for procuring and/or otherwise managing various administrative services, and contract labor spend silo 514 may be responsible for purchasing and/or otherwise managing contract labor.

Particular procurement data may be categorized into one or more spend silos 504 through 514 based on a set of business classification rules, such as business classification rules 232 discussed above with reference to FIG. 6, for example. In a particular embodiment, each spend silo 504 through 514 includes information regarding each purchase of products and/or services made by that spend silo. In some embodiments, particular procurement data 22 regarding one or more of the spend silos 504 through 514 may be generated and/or categorized according to particular spend management output 261 generated by data analysis module 206 of spend management component 32. For example, spend management output 261 may include results of an analysis regarding procurements made by particular divisions of a business organization, such as spend silos 504 through 514. In this manner, spend management output 261 generated by spend management component 32 may be used as an input by supplier intelligence component 36.

Procurement data warehouse 14 may also include a set of supplier portfolios 516, each including information regarding a particular supplier, such as information regarding spending by line of business, savings by geography, supplier alignment information, and compliance by sourcing engagements associated with the supplier, for example.

Supplier intelligence analysis 500 may be operable to analyze particular procurement data 22 stored in procurement data warehouse 14 in order to optimize particular supplier management decisions based on a set of supplier intelligence business rules 520. The set of supplier intelligence business rules 520 may be generated or written based on a variety of business rules input 522 and procurement knowledge 524. Supplier intelligence business rules 520 may be stored in supplier intelligence business rules database 518.

Business rules input 522 may include one or more supplier requirements 526, customer requirements 528, contract analysis 530, business requirements 532, and silo spend formulas 533. Supplier requirements 526 may include information regarding pricing of products, sourcing terms and conditions, and spend information, for example. Customer requirements 528 may include information such as performance metrics for delivery of goods (such as a requirement for on-time delivery) and performance requirements regarding pricing, for example. Contract analysis 530 may include information such as contract terms and conditions, and payment terms, for example. Business requirements 532 may include information such as strategic sourcing rules and terms agreed upon by particular suppliers, for example. Silo spend formulas 533 may include formulas regarding each particular division or silo of a business organization for determining spending associated with that division or silo. Silo spend formulas 533 may be generated by business rules experts or subject matter experts, for example, based on a variety of procurement knowledge and historical procurement information. Procurement knowledge 524 may include forecasted conditions, current and historical performance measurements, subject matter expert (SME) intelligence about businesses or industries, and current economic conditions, for example.

In particular embodiments, supplier intelligence business rules 520 may interrelate various silo spend formulas 533 associated with any number of divisions, or silos, of the business organization. For example, a particular supplier intelligence business rule 520 may interrelate at least one silo spend formula 533 associated with first business division with at least one spend formula 533 associated with a second business division. Thus, supplier intelligence business rules 520 may be used by supplier intelligence analysis module 500 to identify the financial effects of procurement decisions made by one division of a business entity on one or more other divisions of the same business entity.

Supplier intelligence analysis module 500 may be operable to analyze procurement data regarding each spend silo 504 through 514 based on one or more supplier intelligence business rules 520 in order to generate a variety of outputs 534. For example, supplier intelligence analysis module 500 may be operable to analyze a complete procurement process, or supply chain, including the spending behaviors of each spend silo 504 through 514. In addition, supplier intelligence analysis module 500 may be operable to determine the financial effects of decisions made by particular spend silos on each other, based on procurement data 22 and supplier intelligence business rules 520. For example, suppose shipping spend silo 510 negotiates a free shipping arrangement with a particular supplier. In response, the supplier may increase its price for particular products or services in order to account for the absorbed shipping costs. The price increases on such products may be included within the price for the products or services negotiated by hardware spend silo 504 with the supplier. In some situations, the increase in spending by hardware spend silo 504 due to the price increases made by the supplier is greater than the amount saved by shipping spend silo 510 from the negotiated free shipping. Thus, the negotiated free shipping may actually increase the total-cost-of-ownership of the overall procurement process, or supply chain.

In this manner, particular divisions or silos of a business organization often make decisions that are financially advantageous to that division or silo, without realizing various disadvantageous financial effects on other divisions or silos of the business entity, or on the total cost associated with the procurement process or supply chain. By analyzing the total-cost-of-ownership associated with a procurement process or supply chain, supplier intelligence analysis module 500 is operable to identify such financial relationships between particular divisions or silos of the business organization and to suggest particular procurement decisions accordingly.

In particular embodiments, supplier intelligence analysis modules 500 may include a variety of analytical tools operable to perform various supplier intelligence analyses. For example, supplier intelligence analysis module 500 may include some or all of the analytical tools discussed above with reference to data analysis module 206 shown in FIGS. 6 and 7. Thus, in particular embodiments, supplier intelligence analysis module 500 may include one or more optimization tools, simulation tools, forecasting and trends analysis tools, and statistical tools, for example.

For example, supplier intelligence analysis module 500 may be operable to performing simulations based on a set of hypothetical procurement decisions. A particular simulation may include selecting a set of hypothetical procurement decisions regarding a procurement process (such as selecting particular products to purchase, from particular suppliers, and using particular types of shipping, for example) and determining various costs associated with the procurement process, as well as savings or losses as compared with simulations performed based on various other hypothetical procurement decisions. For example, supplier intelligence analysis module 500 may be operable to determining a total cost associated with the procurement process based on each simulation.

Output subsystem 502 may be operable to generate a variety of outputs 534 operable to assist decision-makers in making procurement decisions based on a total-cost-of-ownership view. For example, output subsystem 502 may be operable to generate various outputs 534 illustrating the effect of particular procurement decisions on the total cost associated with the procurement process, or supply chain.

In particular embodiments, output subsystem 502 is the same as or similar to output subsystem 252 of spend management component 32 or output subsystem 308 of compliance management component 34. For example, output subsystem 502 may include a data visualization module operable to generate various data visualizations 536 and a business intelligence reporting module operable to generate various business intelligence reports 538 including results of analyses performed by supplier intelligence analysis module 500.

FIG. 14 illustrates an example method of managing supplier intelligence in accordance with an embodiment of the present invention. At step 550, a variety of procurement data may be collected in a procurement data warehouse. The procurement data may include procurement source data collected from a variety of heterogeneous data sources, as well as particular output from contracts management component 30 and/or spend management component 32 of system 10. The contracts management output may include, or be based on, relevant information automatically extracted from a set of electronic contracts, such as described above with respect to FIG. 2. The output from spend management component 32 may include results of one or more spending analysis performed by spend management component 32, as described above with respect to FIG. 6.

At step 552, some or all of the procurement data may be categorized according to one or more divisions, or silos, of a business organization with which the procurement data is associated. The procurement data may be categorized by one or more business classification rules and/or may include particular output from spend management component 32 regarding particular analysis of spending or procurements made by one or more of the divisions or silos. In particular embodiments, each division or silo is responsible for managing the spending or procurements made by that division or silo. At step 553, one or more silo spend formulas may be generated and/or stored. Each silo spend formulas may include formulas relating to each division or silo of a business organization for determining spending associated with that particular division or silo.

At step 554, a set of supplier intelligence business rules may be generated based on a variety of business rules input and/or procurement knowledge. In a particular embodiment, the variety of business rules input includes supplier requirements, customer requirements, business requirements, and contract analysis. The business rules may be designed to optimize particular decisions within a procurement process, or supply chain, based on a large volume of information regarding the spending or procurement behavior of each of the business organization divisions or silos. In particular embodiments, the supplier intelligence business rules may be generated such that they interrelate various silo spend formulas (generated and/or stored at step 553) associated with any number of divisions, or silos, of the business organization.

For example, a particular supplier intelligence business rule may interrelate at least one silo spend formula associated with a first business division with at least one spend formula associated with a second business division.

At step 556, the procurement data regarding some or all of the business organization divisions or silos may be analyzed based on the supplier intelligence business rules to generate various outputs that may be used to make efficient spending or procurement decisions based on a total-cost-of-ownership perspective. For example, a portion of the procurement data may be analyzed to determine the effect of decisions made by one spending division or silo on one or more other spending divisions or silos of the same business organization, based on a total-cost-of-ownership perspective.

At step 558, one or more visual outputs may be generated based on the analysis performed at step 556. Such visual outputs may include a variety of data visualization and/or business intelligence reports, such as described above with respect to FIGS. 6 and 10.

At step 560, the procurement data stored in the procurement data warehouse may be periodically modified and/or new procurement data may be periodically added. For example, in particular embodiments, the procurement data may be modified based on a modification or addition to the collected source data, contracts management output, spend management output, or one or more of the supplier intelligence business rules. In particular embodiments, the procurement data stored in the procurement data warehouse may be modified automatically and in real time. The method may then return to step 556 to analyze the new and/or modified procurement data. In this manner, supplier intelligence analysis may be performed periodically and in real time based on the procurement data currently stored in the procurement data warehouse.

It should be understood that in particular embodiments, supplier intelligence component 34 may include various software embodied in computer-readable media and operable to perform all or portions of the functions and/or methods described above with respect to FIGS. 13-14. Such software may be concentrated in a particular software package or distributed in any number of software modules, programs, routines, or other collections of code, which may or may not be geographically distributed.

FIG. 15 illustrates a display 600 of an example output 534 generated by supplier intelligence analysis module 500 in accordance with an embodiment of the present invention. Display 600 illustrates the financial savings and/or losses associated with free shipping of hardware provided by a number of different suppliers, based on a total-cost-of-ownership analysis of a supply chain.

Display 600 may include a supplier intelligence table 602 and a number of interactive tools 604. In the example shown in FIG. 15, supplier intelligence table 602 includes a list of suppliers 606 providing free shipping for hardware OEM (original equipment manufacturer) products procured by a purchasing business organization, as well as a number of metrics indicating savings and losses associated with such free shipping. Such metrics may be determined by supplier intelligence analysis module 500 based on an analysis of procurement data regarding each spend silo 504 through 514 according to the set of supplier intelligence business rules 520. Column 608 indicates financial losses incurred by the purchasing business organization as a result of the free shipping provided by each supplier 606. For example, column 608 may indicate financial losses due to free shipping as compared to a total supply chain cost determined without free shipping. Such losses may be attributed to the supplier 606 increasing prices or reducing discounts associated with particular products in order to compensate for providing free shipping, for example. Thus, such losses may be realized by one or more spend silos 504 through 514, such as hardware spend silo 504, for example.

Column 610 indicates the amounts of saving associated with the free shipping provided by each supplier 606, without accounting for various financial losses resulting from the free shipping, such as the losses identified in column 608. For example, column 610 may indicate savings incurred by shipping spend silo 510 as a result of the free shipping, without accounting for losses incurred by hardware spend silo 504 due to increased prices or reduced discounts, for example. Column 612 indicates the total amount spent by the purchasing business organization on hardware OEM from each supplier 606. Column 614 indicates a percentage savings of the total amount spent from each supplier 606 (as indicated by column 612) due to savings realized by the free shipping provided by each supplier 606 (as indicated in column 610).

Display 600 may be displayed by an interactive user interface, such as in a WINDOWS environment, for example, such that a user may navigate through the display and request additional analysis using interactive tools 604. In particular embodiments, display 600 is presented by an Internet browser and includes various icons, pull-down menus and/or hypertext items that may be selected by a user to retrieve additional information regarding particular items or analysis.

Output 534 generated by supplier intelligence analysis module 500, such as the output displayed in supplier intelligence table 602, for example, may be used to make efficient spending or procurement decisions based on a total-cost-of-ownership, or a complete supply chain, perspective. For example, individuals responsible for making procurement decisions for a particular division or silo of the business organization may be able to make optimized decisions based on the total cost of a procurement process or supply chain, including realizing the effects of procurement decisions made regarding that division or silo on various other divisions or silos within the business organization.

Although an embodiment of the invention and its advantages are described in detail, a person skilled in the art could make various alternations, additions, and omissions without departing from the spirit and scope of the present invention as defined by the appended claims.

What is claimed is:

1. A computer-implemented method of managing supplier intelligence, comprising:

collecting procurement data regarding a procurement process from a plurality of data sources, the procurement data including information regarding a plurality of business divisions of a business entity;

for each business division, generating a set of spend formulas for determining spending associated with that business division;

generating a set of supplier intelligence business rules based on a variety of business parameters, each supplier intelligence business rule interrelating at least one spend formula associated with a first one of the business divisions with at least one spend formula associated with a second one of the business divisions;

performing, using a computer system, an automatic analysis of at least a portion of the procurement data based on one or more of the set of supplier intelligence business rules to determine the financial effects of a decision made by the first business division on the second business division; and automatically generating a visual output indicating the results of the automatic analysis of the at least a portion of the procurement data.

2. The method of claim 1, wherein the procurement data includes information automatically extracted from a plurality of electronic contracts based on a set of linguistic rules.

3. The method of claim 1, further comprising:
storing a plurality of electronic contracts including unstructured textual data;
determining one or more linguistic patterns associated with a business parameter;
generating linguistic rules based on the one or more linguistic patterns; and
using text mining tools to automatically extract information regarding the business parameter from the unstructured textual data using one or more of the linguistic rules; and
wherein collecting procurement data regarding a procurement process from a plurality of data sources includes receiving at least a portion of the automatically extracted information.

4. The method of claim 1, wherein the automatic analysis includes analyzing particular procurement information regarding the first business division and the second business division based on one or more of the set of supplier intelligence business rules to determine the effect of particular procurement decisions of the first business division on the second business division.

5. The method of claim 4, wherein:
the automatic analysis includes determining a financial business opportunity based on the determined effect of particular procurement decisions of the first business division on the second business division; and
the automatically generated visual output illustrates a financial business opportunity.

6. The method of claim 1, wherein the automatic analysis includes:
determining a total cost associated with the procurement process; and
determining the financial effects of particular procurement decisions of one or more of the plurality of business divisions on the total cost.

7. The method of claim 1, wherein the automatic analysis includes:
performing one or more simulations, each simulation including:
selecting a set of hypothetical procurement decisions regarding the procurement process; and
determining a total cost associated with the procurement process based on the set of hypothetical procurement decisions selected for that simulation; and
wherein the automatically generated visual output illustrates the effect of particular procurement decisions on the total cost associated with the procurement process.

8. The method of claim 1, wherein the automatically generated visual output comprises a three-dimensional visualization.

9. The method of claim 1, wherein the automatically generated visual output comprises a plurality of visualizations which may be navigated through using automated navigation tools.

10. The method of claim 1, wherein collecting procurement data from a plurality of data sources comprises:
collecting procurement data from a plurality of data sources;
periodically receiving additional procurement data from one or more of the plurality of data sources; and
updating the procurement data based on the additional procurement data.

11. Software for managing supplier intelligence, the software being embodied in a non-transitory computer-readable media and when executed by one or more processing units operable to:
collect procurement data regarding a procurement process from a plurality of data sources, the procurement data including information regarding a plurality of business divisions of a business entity;
for each business division, generate a set of spend formulas for determining spending associated with that business division;
generate a set of supplier intelligence business rules based on a variety of business parameters, each supplier intelligence business rule interrelating at least one spend formula associated with a first one of the business divisions with at least one spend formula associated with a second one of the business divisions; and
perform an analysis of at least a portion of the procurement data based on one or more of the set of supplier intelligence business rules to determine the financial effects of a decision made by the first business division on the second business division;
generate a visual output indicating the results of the analysis of the at least a portion of the procurement data.

12. The software of claim 11, wherein the procurement data includes information automatically extracted from a plurality of electronic contracts based on a set of linguistic rules.

13. The software of claim 11, further operable to:
store a plurality of electronic contracts include unstructured textual data;
access linguistic rules generated based on one or more linguistic patterns associated with a business parameter; and
using text mining tools to extract information regarding the business parameter from the unstructured textual data using one or more of the linguistic rules; and
wherein collecting procurement data regarding a procurement process from a plurality of data sources includes receiving at least a portion of the automatically extracted information.

14. The software of claim 11, wherein the analysis includes analyzing particular procurement information regarding the first business division and the second business division based on one or more of the set of supplier intelligence business rules to determine the effect of particular procurement decisions of the first business division on the second business division.

15. The software of claim 14, wherein:
the analysis includes determining a financial business opportunity based on the determined effect of particular procurement decisions of the first business division on the second business division; and
the visual output illustrates a financial business opportunity.

16. The software of claim 11, wherein the analysis includes:
determining a total cost associated with the procurement process; and
determining the financial effects of particular procurement decisions of one or more of the plurality of business divisions on the total cost.

17. The software of claim 11, wherein the analysis includes:
performing one or more simulations, each simulation including:

selecting a set of hypothetical procurement decisions regarding the procurement process; and determining a total cost associated with the procurement process based on the set of hypothetical procurement decisions selected for that simulation; and wherein the visual output illustrates the effect of particular procurement decisions on the total cost associated with the procurement process.

18. The software of claim 11, wherein collecting procurement data from a plurality of data sources comprises:

collecting procurement data from a plurality of data sources;

periodically receiving additional procurement data from one or more of the plurality of data sources; and updating the procurement data based on the additional procurement data.

19. A system for managing supplier intelligence, comprising:

a data warehouse operable to collect procurement data regarding a procurement process from a plurality of data sources, the procurement data including information regarding a plurality of business divisions of a business entity;

a supplier intelligence business rules database operable to store a set of supplier intelligence business rules, each supplier intelligence business rule generated based on a variety of business parameters and interrelating at least one spend formula associated with a first one of the business divisions with at least one spend formula associated with a second one of the business divisions; and one or more processing units operable to execute:

an analysis module operable to perform an analysis of at least a portion of the procurement data based on one or more of the set of supplier intelligence business rules to determine the financial effects of a decision made by the first business division on the second business division; and a data visualization module operable to generate a visual output indicating the results of the analysis.

20. The system of claim 19, wherein the procurement data includes information automatically extracted from a plurality of electronic contracts based on a set of linguistic rules.

21. The system of claim 19, further comprising:

a contracts database operable to store a plurality of electronic contracts include unstructured textual data;

a linguistic rule database operable to store linguistic rules generated based on one or more linguistic patterns associated with a business parameter;

a text mining module comprising text mining tools operable to automatically extract information regarding the business parameter from the unstructured textual data using one or more of the linguistic rules; and wherein collecting procurement data regarding a procurement process from a plurality of data sources includes receiving at least a portion of the automatically extracted information.

22. The system of claim 19, wherein the analysis includes analyzing particular procurement information regarding the first business division and the second business division based on one or more of the set of supplier intelligence business rules to determine the effect of particular procurement decisions of the first business division on the second business division.

23. The system of claim 22, wherein:

the analysis includes determining a financial business opportunity based on the determined effect of particular procurement decisions of the first business division on the second business division; and the visual output illustrates a financial business opportunity.

24. The system of claim 19, wherein the analysis includes:

determining a total cost associated with the procurement process; and determining the financial effects of particular procurement decisions of one or more of the plurality of business divisions on the total cost.

25. The system of claim 19, wherein the analysis includes:

performing one or more simulations, each simulation including:

selecting a set of hypothetical procurement decisions regarding the procurement process; and determining a total cost associated with the procurement process based on the set of hypothetical procurement decisions selected for that simulation; and wherein the visual output illustrates the effect of particular procurement decisions on the total cost associated with the procurement process.

26. The system of claim 19, wherein the data warehouse is operable to collect procurement data from a plurality of data sources by:

collecting procurement data from a plurality of data sources;

periodically receiving additional procurement data from one or more of the plurality of data sources; and updating the collected procurement data based on the additional procurement data.

* * * * *

UNITED STATES PATENT AND TRADEMARK OFFICE
CERTIFICATE OF CORRECTION

PATENT NO.       : 8,103,534 B2                                       Page 1 of 1
APPLICATION NO.  : 10/279188
DATED            : January 24, 2012
INVENTOR(S)      : Jeffrey M. Kruk et al.

It is certified that error appears in the above-identified patent and that said Letters Patent is hereby corrected as shown below:

On the face page, in field (75), Inventors, in column 1, line 3, delete "Kasra Kasravi,"
and insert -- Kas Kasravi, --, therefor.

Signed and Sealed this
Thirtieth Day of October, 2012

David J. Kappos
*Director of the United States Patent and Trademark Office*